(12) United States Patent
Martin et al.

(10) Patent No.: US 6,318,817 B1
(45) Date of Patent: *Nov. 20, 2001

(54) ELECTRO-HYDRAULIC BRAKING SYSTEMS

(75) Inventors: Peter Martin, Coldfield; Barry John Bridgens, Quarry Bank; Alan Leslie Harris, Coventry; Michael John Holt, Kenilworth, all of (GB); Andrew William Kingston, Heidescheim (DE); Robert Louis Ferger, Bad Homburg (DE); Salvatore Oliveri, Filsen (DE)

(73) Assignee: Lucas Industries plc (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/147,184
(22) PCT Filed: Apr. 25, 1997
(86) PCT No.: PCT/GB97/01159
  § 371 Date: May 6, 1999
  § 102(e) Date: May 6, 1999
(87) PCT Pub. No.: WO97/39931
  PCT Pub. Date: Oct. 30, 1997

(30) Foreign Application Priority Data

Apr. 25, 1996 (DE) .............................. 196 16 538
Jan. 23, 1997 (GB) .................................... 9701389

(51) Int. Cl.$^7$ ...................................................... B60T 8/40
(52) U.S. Cl. .................................... 303/116.1; 303/119.1; 303/122.03
(58) Field of Search .................................. 303/3, 10, 11, 303/15, 16, 17, 25, 26, 28, 29, 84.2, 113.1, 115.1, 115.2, 115.4, 115.5, 122.03, 125, 167, DIG. 11, 116.1, 116.2, 119.1, 113.2; 701/78, 83

(56) References Cited

U.S. PATENT DOCUMENTS

| 4,640,555 | 2/1987 | Bertling et al. . |
| 4,656,833 | 4/1987 | Belart . |

(List continued on next page.)

FOREIGN PATENT DOCUMENTS

| 34 08 872 A1 | 9/1985 | (DE) . |
| 42 01 732 A1 | 7/1993 | (DE) . |

(List continued on next page.)

*Primary Examiner*—Robert J. Oberleitner
*Assistant Examiner*—Thomas J. Williams
(74) *Attorney, Agent, or Firm*—MacMillan, Sobanski & Todd, LLC

(57) ABSTRACT

An electro-hydraulic braking system for motor vehicles. The system includes a brake pedal and a braking device associated with at least one vehicle wheel which is brought into communication with an electronically controlled valve arrangement in order to apply hydraulic fluid under pressure to the braking device. A fluid pressure accumulator fed by the pump provides a pressurized hydraulic fluid which can be passed to the braking device by way of an electronically controlled valve arrangement in order to apply hydraulic fluid in proportion to the driver braking demand as sensed at the brake pedal in the "brake by wire" mode. A first device within the system provides a level of fluid pressure supply within the electro-hydraulic system whose highest value is less than that sufficient for the maximum possible braking demand level which may be required. A second device within the system recognizes a braking demand level which exceeds that which can be achieved by the highest value of fluid pressure available by the first device and establishes a higher level of fluid pressure supply within the system for controlling the brakes in accordance with the driver's demanded braking level.

15 Claims, 14 Drawing Sheets

U.S. PATENT DOCUMENTS

| | | |
|---|---|---|
| 4,723,412 | 2/1988 | Buschmann . |
| 4,812,777 * | 3/1989 | Shirai ................................ 303/10 |
| 4,834,465 * | 5/1989 | Guichard et al. .................. 303/3 |
| 4,880,282 | 11/1989 | Makino et al. . |
| 4,914,917 * | 4/1990 | Schonlau ...................... 303/113.4 |
| 4,950,038 * | 8/1990 | Ocvirk et al. ................ 303/113.2 |
| 5,195,810 | 3/1993 | Ocvirk et al. . |
| 5,197,787 | 3/1993 | Matsuda et al. . |
| 5,282,676 | 2/1994 | Takeda et al. ................ 303/113.2 |
| 5,447,363 * | 9/1995 | Fukamachi ..................... 303/125 |
| 5,460,436 * | 10/1995 | Volz et al. ..................... 303/113.2 |
| 5,484,194 * | 1/1996 | Reinartz et al. ............... 303/116.2 |
| 5,547,264 | 8/1996 | Tozu et al. . |
| 5,567,021 | 10/1996 | Gaillard . |
| 5,722,744 | 3/1998 | Kupfer et al. . |
| 5,727,852 * | 3/1998 | Pueschel et al. ............ 188/DIG. 1 |
| 5,743,600 * | 4/1998 | Yasuda et al. ................ 303/116.2 |
| 5,918,948 * | 7/1999 | Burgdorf et al. ............. 303/113.2 |
| 5,941,608 * | 8/1999 | Campau et al. ................ 303/84.2 |
| 5,979,999 * | 11/1999 | Poertzgen et al. ............ 303/116.1 |
| 6,074,019 * | 6/2000 | Phillips et al. ............... 303/116.1 |
| 6,082,830 * | 7/2000 | Volz et al. .................... 303/113.2 |

FOREIGN PATENT DOCUMENTS

| | | |
|---|---|---|
| 0 348 270 A1 | 12/1989 | (EP) . |
| WO 93/00236 | 1/1993 | (WO) . |
| WO 96/11129 | 4/1996 | (WO) . |

\* cited by examiner

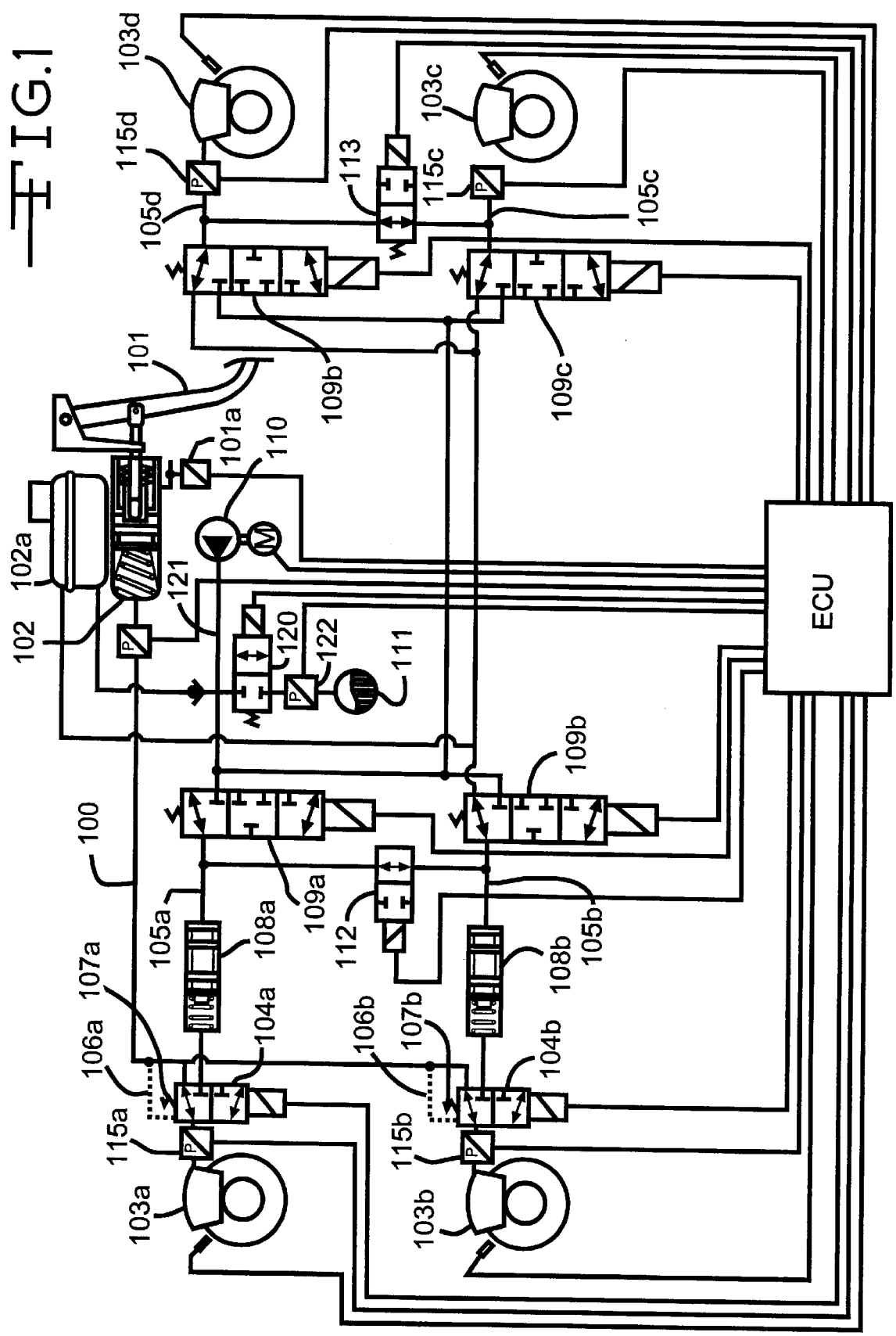

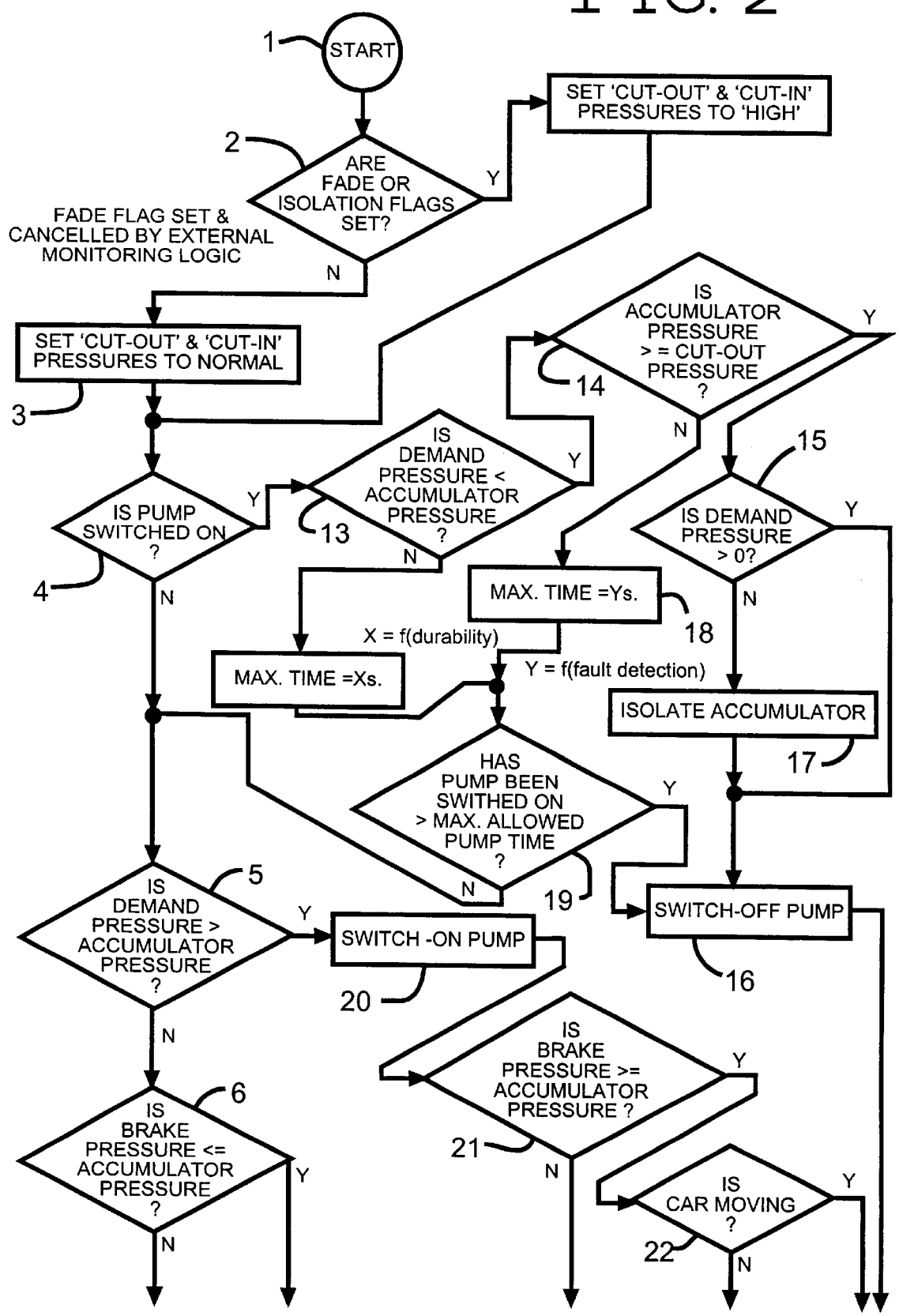

ELECTRO-HYDRAULIC BRAKING SYSTEMS

BACKGROUND OF THE INVENTION

1. Field of the Invention

The present invention relates to electro-hydraulic braking EHB systems for motor vehicles.

2. Discussion of the Background

Electro-hydraulic braking systems for motor vehicles are known which comprise a brake pedal, a braking device connected to at least one vehicle wheel, which is capable of being brought into communication with an electronically controlled valve arrangement, in order to apply hydraulic fluid under pressure to the braking device, a hydraulic pump, and a hydraulic pressure reservoir fed by said pump for the provision of hydraulic fluid under pressure which can be passed to the braking device via the electronically controlled valve arrangement, in order to apply hydraulic fluid under pressure, in proportion to the driver's braking demand as sensed at the brake pedal, to the braking device in so called 'brake by wire' mode.

In the case of an electro-hydraulic braking system of this form, the braking energy required for braking the vehicle is provided in normal use by the electrically-actuated braking system ("brake-by-wire" mode). In order however, to brake the vehicle with the minimum of delay in the event of an unexpected failure of the electrically-actuated bring system, the braking system can also feature an ancillary hydraulic braking system for the immediate actuation of the brakes ("push-through" mode).

The area of application of an electro-hydraulic braking system of his form encompasses anti-locking brake system control, anti-slip control, electronic brake force distribution, and Car Dynamic Control, or "CDC".

In view of the fact that, with an electrically-actuated braking system, the driver's wishes are acquired by sensors at the brake pedal, and conducted to the electronic control system by means of electrical signals, such systems are described as electronic braking systems (EBS) or "brake-by-wire" systems.

To provide the redundant hydraulic emergency system, a direct connection can be established between the brake pedal and the brakes, in a conventional manner, by means of switch over valves and hydraulic lines, which is referred to as "push-through". This system requires a switching device by which, under normal operating conditions, the brake pressure which is produced in the electrical system, and, in the event of a defect in or the failure of the electrical system, the brake pressure produced in the hydraulic ancillary system, is transferred to the brakes.

An electro-hydraulic braking system capable of operating using the "push-through" technique is known from U.S. application Ser. No. 721,019.

The control valve arrangement is usually designed as a slide valve, with the result that leakages and lack of fluid tightness are inevitable. Consequently, a drop in the pressure of the hydraulic fluid contained in the hydraulic pressure reservoir cannot be avoided, in particular if the vehicle remains out of operation for extended periods. In addition to this, with the conventional system, the components associated with the hydraulic pressure reservoir (lines, seals, connections, etc.) are constantly subjected to sustained high, and cyclically varying pressure levels which prevail in the hydraulic fluid supply system. This can lead to premature material fatigue, leaks, and similar problems.

According to the known system of DE-A-4115356, there is provided an electrohydraulic braking system wherein a main pressure accumulator supplies the pressure for operating the brakes under the majority of operating conditions but whose maximum value is less than the maximum possible braking demand pressure which may be required to be met in use of the associated vehicle. Upon recognition of a braking demand which exceeds that which can be achieved using the main accumulator, a second, supplementary accumulator is arranged to be switched in. However, this system can supply at higher than normal pressures only the volume stored in the supplementary accumulator. Once the latter volume has been consumed, the pump will re-pressurise the brakes at the same time as it is re-pressurising the main and supplementary accumulators, ie. relatively slowly.

According to DE-A-4328304 there is provided a vehicle having an arrangement for braking the vehicle automatically when a collision with another vehicle running ahead is predicted. The system has an oil pump and a single pressure accumulator. Under normal braking, fluid is supplied to the brake lines via a pair of depressurizing solenoid valves. When a collision is predicted and the vehicle is running at a low speed, the depressurising valves are closed, a pair of pressurizing solenoid valves are opened, and the pump is energized so that a relatively low pressure is supplied to the brake lines from the pump via the open depressurizing valves. When a collision is predicted and tie vehicle is running at a high speed, the repressurizing valves are closed, the pump is energised and the depressurizing valves are repeatedly opened and closed so that a higher pressure is supplied step-wise to the brake lines from the accumulator via the depressurizing valves. Again, the maximum pressure that can be supplied is limited to the low pump pressure at low vehicle speeds and to the (higher) accumulator brake pressure at medium or high vehicle speeds.

SUMMARY OF THE INVENTION

A first aim of the present invention is accordingly to develop an electro-hydraulic braking system capable of "push-through" operation which avoids the disadvantages outlined above, and is capable of meeting the high demand for safety.

Furthermore, in modern vehicle systems, there are requirements to reduce costs, component weight, complexity and, more recently, to reduce system energy consumption. These savings have to be made without detriment to safety or system function. In the case of an electronically controlled braking system (EBS or Brake by Wire) having automatic hydraulic or pneumatic (fluid) braking, savings can be made in all areas by addressing the issue of pressurised fluid storage for brake actuation.

In a typical EBS system, a fluid pressure accumulator (pressurised reservoir) is used to store fluid under pressure, charged by use of a fluid pump or compressor driven either by an electric motor or directly from the engine via a belt and pulley arrangement, for supply to a valve system which is adapted to supply the brake or brakes of a vehicle with fluid pressure in accordance with the level of driver's braking demand. Typically, the pressure at which the fluid is stored within the accumulator is set at a relatively high level, which is set so as to be sufficient to actuate the brakes of the vehicle over the complete braking range of the vehicle. In order to achieve this relatively high pressure storage, a high pressure accumulator and pump system has to be employed with sufficient volume to supply several low pressure demands as well as sufficient pressure and volume to supply the infrequent high pressure brake applications. Frequent motor starts in such systems are disadvantages and to be avoided if possible.

Such an accumulator and pump arrangement is relatively expensive and large and the frequent recharging of the accumulator up to the infrequently used high pressure levels consumes a significant excess of energy which has to be supplied by the vehicle electrical system or directly from an engine power take off, both of which degrade the fuel efficiency of the vehicle and increase component cost. Large accumulator and pump systems also add significant weight/mass to the brake system assembly which is undesirable from the vehicle manufacturers view point.

It is a second aim of the present invention to overcome the aforegoing problems by arranging for the accumulator system to be so arranged that the pressure level up to which the pump can supply will vary, within limits, in accordance with the braking demand.

In accordance with a first aspect of the present invention, there is provided an electro-hydraulic braking system for motor vehicles which comprises a brake pedal, a braking device which is associated with at least one vehicle wheel and is capable of being brought into communication with an electronically controlled valve arrangement in order to apply hydraulic fluid under pressure to the braking device, a hydraulic pump, and a fluid pressure accumulator fed by the pump for the provision of pressurised hydraulic fluid which can be passed to the braking device via the electronically controlled valve arrangement, in order to apply hydraulic fluid under pressure, in proportion to the driver's braking demand as sensed at the brake pedal, to the braking device in a 'brake by wire' mode, a first means which provides a level of fluid pressure supply within the electro-hydraulic system whose highest value is less than that sufficient for the maximum possible braking demand level which may be required to be met in use of the vehicle, and a second means which, upon recognition of a braking demand level or of a potential braking demand level which exceeds or will exceed that which can be achieved by said highest value of fluid pressure supply available via said first means, establishes a higher level of fluid pressure supply within the system for controlling the brakes in accordance with the driver's demanded braking level wherein the second means comprises a control arrangement which causes the system stiffness to be increased upon recognition of the higher braking demand or potential higher demand which exceeds or will exceed that which can be achieved by said highest value of the fluid pressure supply available via said first means, by isolating the fluid accumulator from the braking system, whereby the braking system is then effectively charged directly from a motor-driven pump to a higher fluid pressure supply level that corresponds to at least the driver's demanded pressure.

In accordance with a second aspect of the present invention there is provided an electro-hydraulic braking system for motor vehicles which comprises a brake pedal, a braking device which is associated with at least one vehicle wheel and is capable of being brought into communication with an electronically controlled valve arrangement in order to apply hydraulic fluid under pressure to the braking device, a hydraulic pump, and a fluid pressure accumulator fed by the pump, for the provision of pressurised hydraulic fluid which can be passed to the braking device via the electronically valve arrangement, in order to apply hydraulic fluid under pressure, in proportion to the driver's braking demand as sensed at the brake pedal, to the braking device in a 'brake by wire' mode, a first means which provides a level of fluid pressure supply within the electro-hydraulic system whose highest value is less than that sufficient for the maximum possible braking demand level which may be required to be met in use of the vehicle, and a second means which, upon recognition of a braking demand level or of a potential braking demand level which exceeds or will exceed that which can be achieved by said highest value of fluid pressure supply available via said first means, establishes a higher level of fluid pressure supply within the system for controlling the brakes in accordance with the driver's demanded braking level, characterised in that said second means is adapted to start the pump to charge the accumulator to a higher level, either when the demanded pressure level rises to a level which is higher than that which is currently available from the accumulator, or in advance of a high demand condition, in accordance with a detected or predicted brake condition.

In the latter case, the second means can be adapted to charge the accumulator to a higher pressure level, in advance of a high demand condition, in accordance with a detected or predicted level of brake fade, or lining fade change. Preferably, the detected or predicted brake fade is measured over several vehicle stops and said detected level of lining fade is measured over a single stop.

In cases where the brake system stiffness is to be increased when high pressure is required by the brakes, the increase in stiffness can be achieved by arranging a controllable shut-off valve between the hydraulic pump and the accumulator (hydraulic pressure reservoir) in order to enable a connection between the hydraulic pump and the accumulator to be selectively created or removed.

Surprisingly, the latter feature enables the following measures to be attained.

In view of the fact that the control valve arrangements are designed preferably as slide valves, which incur leakages as an inherent result of the design, the presence of the shut-of valve prevents any seepage of the brake fluid stored in the hydraulic pressure reservoir, or a drop in the operating pressure in the hydraulic pressure reservoir itself. This is of particular significance if the vehicle remains out of operation for an extended period.

Leakages incurred as the result of defects (line fractures, defective seal mountings, etc.) will likewise be avoided.

In a preferred embodiment of the invention, the shut-off valve is designed as an electro-magnetically actuatable ball valve. Ball valves are free of leaks as an inherent result of their operational principle, with the result that the concept on which this aspect of the invention is based can be achieved particularly easily. Alternatively, the shut-off valve can be a spool (slide) valve. Leakage will be low if a long overlap is used; both operating current and size can be reduced significantly if a spool valve of this type is used.

Preferably, an electronic control unit (ECU) is provided, which is connected with a first sensor for the acquisition of the static and dynamic conditions prevailing in the braking system and, in particular, at the brake pedal, and the signals issued from the latter sensor are used for the generation of control signals for the shut-off valve.

The hydraulic pressure reservoir is preferably designed as a gas-pressure reservoir, and the electronic control device is designed in such a way as to actuate the hydraulic pump, as a function of a signal from a second sensor, in order to charge the hydraulic pressure reservoir.

The ideal operating pressure of the hydraulic pressure reservoir/accumulator is of the order of between 130 bar and 160 bar. If a gas-pressure reservoir is used as the hydraulic pressure reservoir, the gas filling pressure is dependent on the gas temperature and the ambient temperature respectively. This means that if the gas pressure reservoir is pre-loaded at a temperature of 20° C. Too a gas filling pressure of 90 bar, and the temperature drops to 40° C., the gas filling pressure will drop to about 16 bar.

The pressure in the hydraulic pressure reservoir is monitored by a sensor. If the pressure falls to a value below Pmin e.g. 110 bar, the shut-off valve will be opened and the hydraulic pump set in operation, in order to recharge the pressure reservoir. If brake actuation is necessary during the recharging operation, the shut-off valve provides the possibility of the hydraulic pressure reservoir being blocked off, with the result that the filling of the wheel brakes with brake fluid can take place directly by means of the hydraulic pump. In view of the fact that the hydraulic pressure reservoir is blocked of, the pump does not deliver any brake fluid into the hydraulic pressure reservoir during the brake actuation period, with the result that a more rapid pressure build-up can take place in the wheel brakes.

In addition to this, the electronic control unit (ECU) can be designed, as a function of a signal initiated by the actuation of the brake pedal from said the first sensor, as well as a signal generated as a result of a hydraulic pressure in the hydraulic pressure reservoir which is below a predetermined value, deriving from the second sensor, to actuate the shut-off valve in the sense of supplanting the connection between the hydraulic pump and the hydraulic pressure reservoir.

In addition to this, the electronic control unit (ECU) can be designed to actuate the shut-off valve in the sense of supplanting the connection between the hydraulic pump and the hydraulic pressure reservoir, and to impose actuation signals on the hydraulic pump in such a way that the hydraulic pump generates a predetermined pressure profile, which is acquired by the sensors present in the braking system, and is conducted in the form of corresponding sensor signals to the electronic control unit (ECU), for the purpose of effecting a comparison between the predetermined pressure profile and the pressure curve acquired by the sensors.

In the event of the pressure reservoir being blocked off, monitoring can be provided for the pressure sensors by means of a specific pressure curve being predetermined for the pump, this curve being compared with the pressure curve acquired by means of the pressure sensors.

Advantageously, the electronic control unit (ECU) can be designed so as to-actuate the shut-off valve in the sense of establishing the connection between the hydraulic pump and the hydraulic pressure reservoir, and to impose actuation signals on the hydraulic pump, in such a way that the hydraulic pump creates a hydraulic pressure which is above the maximum operating pressure of the hydraulic pressure reservoir.

In the event of a pressure build-up above the maximum operating pressure of the pressure reservoir being required, this can be effected with the pressure reservoir shut off, by the pump, and likewise within a short period of time.

A pressure reservoir with smaller volume can also be used, as a result of which installation space can be saved, since the desired pressure curves can be achieved by means of an appropriate hydraulic pump.

In accordance with a further aspect of the present invention, the initially stated problem is solved by arranging for the pump to be started immediately if brake-pressure demand cannot be fulfilled, the accumulator pressure-based cut-in level being set to be less than the maximum brake-pressure requirement.

In the prior art systems, the conventional arrangement is to have the cut-in pressure equal to or higher than the maximum braking requirement. This has the disadvantages of high motor, accumulator and pump cost if the cut-out pressure is set at normal range above cut-in pressure. Furthermore, higher energy consumption is incurred due to the high pressures. If the range is reduced, then the motor starts more often, leading to poor durability, especially of brushgear.

Use of this aspect of the present invention enables the maximum brake pressure specification to be obtained at reduced cost, without restricting the pressure difference between pump cut-out and cut-in.

In accordance with a still further aspect of the present invention, the initially stated problem is solved by arranging for the pump to charge the accumulator in accordance with the detected or calculated brake condition, such as brake fade over several stops, or lining fade change during a single stop.

By monitoring brake usage and/or factors associated therewith and detecting sufficiently high usage over a short period of time, it can be inferred that brake temperatures may be so high that future brake applications will need to be at an elevated pressure and accumulator pressure can be increased in advance in anticipation.

BRIEF DESCRIPTION OF THE DRAWINGS

The invention is described further hereinafter, by way of example with reference to the accompanying drawings, in which:

FIG. 1 is a schematic diagram of a vehicle braking system embodying a first aspect of the present invention;

FIGS. 2 and 2A are a flow diagram showing one possible arrangement for controlling parts of the system of FIG. 1;

DETAILED DESCRIPTION OF THE PREFERRED EMBODIMENTS

Figure 2A:
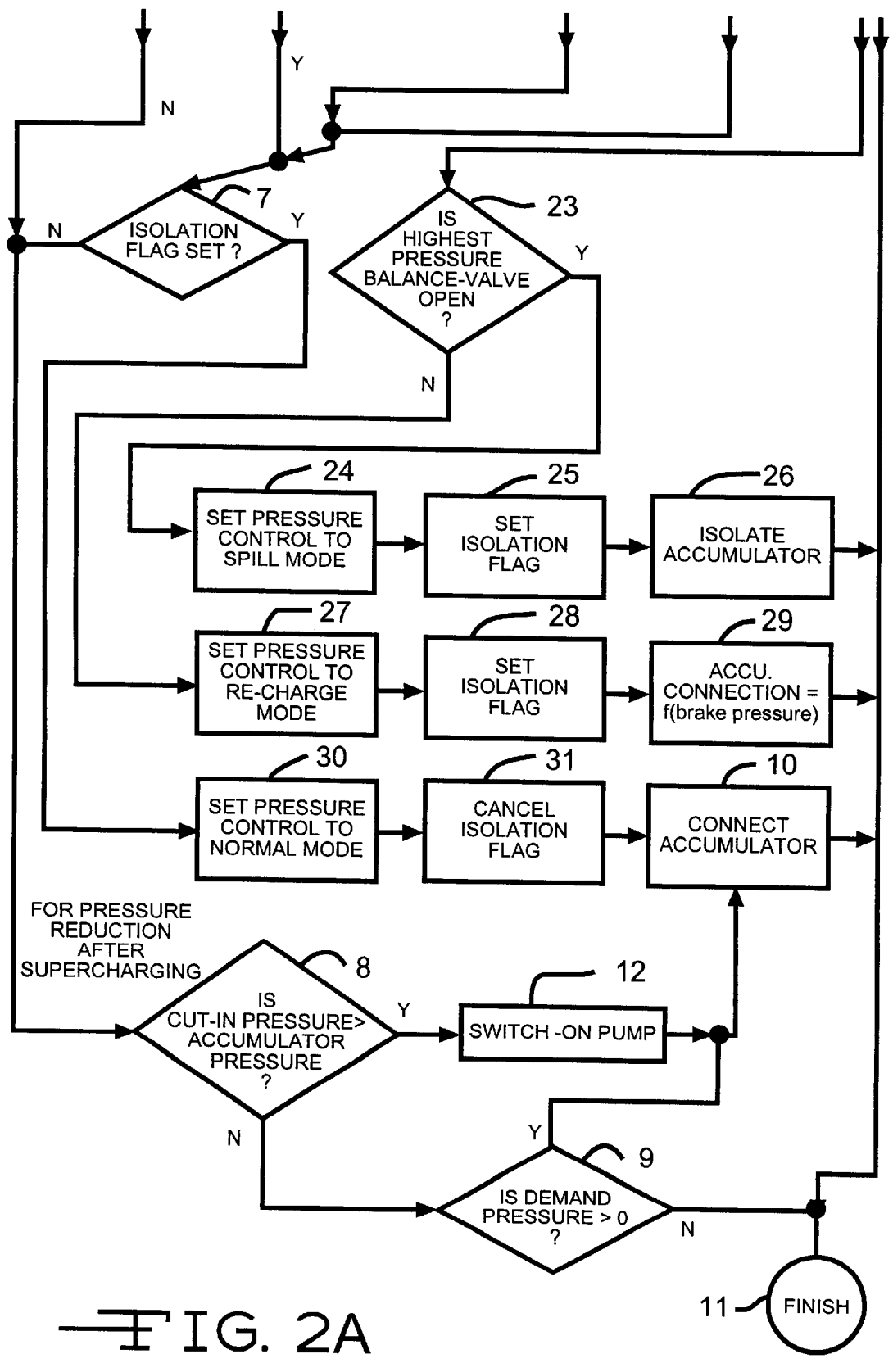

The braking system shown in FIG. 1 includes, for the purpose of the emergency actuation, a "push through" brake circuit 100, which is fed from a brake cylinder 102, actuated by means of the brake pedal 101. The brake pedal 101 has an associated sensor 101*a* for the acquisition of the drivers braking demand. The driver's demand is transferred to an electronic control unit (ECU), evaluated there, and used as the source for the generation of electrical control signals for actuating valves, described in greater detail hereinafter, and a hydraulic pump 110. Switch-over valves 104*a*, 104*b* are arranged between the "push-through" brake circuit 100 and the wheel brakes of a vehicle axle 103*a*, 103*b*, in order to apply brake fluid to the wheel brakes 103*a*, 103*b*, either via the "push-through" brake circuit 100, or via electrically-actuated brake channels 105*a*, 105*b* (brake-by-wire).

The switch over valves 104*a*, 104*b*, in the electrically non-actuated state, i.e. their preferred position, connect the "push-through" brake circuit 100 with the wheel brakes 103*a*, 103*b*, in which situation the connection to the electrically actuated brake channels 105*a*, 105*b* is blocked. In the event of electrical actuation, the switch-over valves 104*a*, 104*b* connect the wheel brakes 103*a*, 103*b*, with the electrically-actuated brake channels 105*b*, 105*b*, allocated to them, in which context, the connections to the "push-through" brake circuit 100 are blocked. In order to increase safety, for example in the event of a defective valve reset spring 107*a*, 107*b*, the switch-over valves 104*a*, 104*b* are each capable of being moved into the preferred position corresponding to the "push-through" actuation, by means of pressure control lines 106*a*, 106*b*.

In addition to this, elements referred to as de-coupling or separation cylinders 108*a*, 108*b*, are connected in the electrically-actuated brake channels 105a, 105*b*, upstream of the switch-over valves 104*a*, 104*b*. By means of the cylinders 108*a*, 108*b*, hydraulic separation between the "push-through" brake circuit 100 and the electrically-actuated brake channels 105*b*, 105*b* is ensured.

Brake pressure modulation in the electrically-actuated brake channels 105*a*, 105*b*, and in the electrically-actuated brake channels 105*c*, 105*d*, which are allocated to the wheel brakes of the other vehicle axle 103*c*, 103*d*, is effected in a known manner by means of control valves 109*a*, 109*b*, 109*c*, 109*d*, the brake pressure being provided by a pump 110 operated by an electric motor, and from a pressure reservoir 111 consisting of a modular unit.

Shut-off valves 112 and 113 are arranged between the electrically-actuated brake channels of a vehicle axle 105*b*, 105*b* and 105*c*, 105*d* respectively. These shut-off valves 112 and 113, in the non-actuated state, respectively connect the brake channels 105*b*, 105*b* and 105*c*, 105*d* to one another, while the brake channels 105*b*, 105*b* and 105*c*, 105*d* are mutually blocked in the actuated state. As a result of this, the possibility arises of the brake channels of a vehicle axle 105*b*, 105*b* and 105*c*, 105*d* being hydraulic ally connected. By means of the connection, differences in the control behaviour between the brake channels of vehicle axles 105*b*, 105*b* and 105*c*, 105*d* can be compensated, which may, for example arise as the result of manufacturing tolerances. This is of advantage in particular in the event of normal braking, since, as in a conventional braking system, the same pressure level is set at the wheel brakes of a vehicle brake 103*a*, 103*b* and 103*c*, 103*d* respectively, with the result that the stability of the vehicle is maintained. If, by contrast, an individual regulation of the brake pressure in the wheel brakes 103*a*, 103*b* and 103*c*, 103*d* is required, which is the case, inter alia, in cases of anti-lock control, anti-slip control, or travel dynamics control, then the hydraulic connection of the brake channels 105*b*, 105*b* and 105*c*, 105*d* respectively is suspended by the actuation of the shutoff valve 112 and 113, respectively.

The system as described thus far is conventional and operates in accordance with well-known techniques. The system of FIG. 1 differs from conventional systems in that a shut-off valve 120 is arranged between the hydraulic pump 110 and the hydraulic pressure reservoir 111, and is designed as a ball valve. By means of this shut-off valve 120, it is possible for leakage problems at the slide valves 109*a*–109*d* to be circumvented. In addition to this, the motor pump unit can be used for pressure modulation (instead of the pressure reservoir 111 or in support of this). In order to achieve a more rapid pressure build-up, especially above the operating pressure of the hydraulic chamber 111, the hydraulic pressure chamber 111 can be isolated from the remainder of the brake system by the shut-off valve 120. This accordingly stiffens the system and makes a more dynamic pressure build-up possible. Also, as described in our earlier PCT Application PCT/GB96/01731 the possibility exists of checking the pressure sensor by monitoring the pump drive circuit.

The pressure in the pressure reservoir 111 is monitored by a sensor 122. If the pressure falls to a value below, for example 110 bar, then the shut-off valve 120 is opened and the pump 110 goes into operation, in order to recharge the pressure reservoir. In the event of brake actuation being necessary during the recharging process, the shut-off valve 120 provides the possibility of the pressure reservoir 111 being blocked off, with the result that the wheel brakes 103*a*, 103*b*, 103*c*, 103*d* can be pressurised directly by the pump 110. If the pressure reservoir 111 is blocked off, the pump does not deliver any brake fluid into the pressure reservoir 111 during brake actuation, with the result that a more rapid pressure build-up can take place in the wheel brakes 103*a*, 103*b*, 103*c*, 103*d*.

In the event of pressure build-up being required above the maximum operating pressure of the pressure reservoir 111, this can be effected within a short period of time by means of the pump 120 with the pressure reservoir 111 being blocked off. If the pressure reservoir 111 is blocked off, the output from the pressure sensors 115*a*, 115*b*, 115*c*, 115*d* can be used to control the driving of the pump motor.

The present system of FIG. 1 also enables higher pressures required to accommodate brake fade conditions to be met using an accumulator with a lower maximum working pressure. In normal brake operation, the maximum pressures demanded by the system lie below 120 bar so that an accumulator charged to 120 bar can satisfactorily meet virtually all demand pressures. However during brake fade conditions, for example with a heavy vehicle on a long mountain descent pressures in excess of 200 bar can be required in the brakes. If the accumulator is run continuously at 200 bar+ to accommodate these conditions, then accumulator life is short due, inter alia, to increased gas diffusion. Furthermore, if the pump is used to pump up the whole system to 200 bar+ on demand for example by detecting brake fade using system software, then the accumulator volume in the system results in an unacceptably slow pressure rise rate. With the use of the system of FIG. 1 having the shut-off valve 120, however, the accumulator 111 can be operated at a relatively low pressure, eg 120 bar and, if then higher pressures are required at the brakes, the pump output flow can be diverted by the shut-off valve 120 into the brakes without going into the accumulator at all.

With the present system, provision has to be made to prevent the pressure at the brakes becoming too high in the event of direct connection to the pump. The pressure can be controlled by switching off the pump (and on again if necessary) or by leaving the pump running continuously and controlling its delivery pressure by using a valve to spill excess fluid to the storage tank.

FIGS. 2 and 2A are a flow diagram showing one possible arrangement for controlling the pump 110 and shut-off valve 120 (accumulator isolation) in accordance with the detection of "fade" conditions.

Referring to FIGS. 2 and 2A, the chart shown in the figures demonstrate several possible modes of operation, as follows:

1. Low braking demand with sufficient accumulator charge

The entry point for the accumulator pressure control algorithm starts at (1). For normal, low braking demands where not previous supercharging or fade detection has occurred, a flag is tested at (2) to determine whether the cut-in and cut-out thresholds should be reset. For normal braking, the cut-in and cut-out threshold are set to a 'normal' low pressure level (3). A test is now made to check if the pump is currently running (4). Normally, where there is sufficient pressure stored within the accumulator to supply the brake demand, the pump would not be running at this point but this would be monitored by checking the actual brake pressure against the level of pressure stored within the accumulator (6). Whilst there is still sufficient pressure stored and also no requirement to isolate the accumulator (7) the pump will not be switched on unless the accumulator pressure drops below the cut-in threshold value (8). For as long as there is a driver's braking demand (9), the accumulator will remain in open connection (10) with the brake system. The control algorithm is now completed (II) and restarted at appropriate intervals during the system control cycle.

2. Low braking demand with accumulator charging

At various time during a brake application there may be a requirement to recharge or top-up the accumulator pressure when the pressure stored reaches the cut-in threshold (8). Should this occur, the pump is switched on (12) and remains switched on until the pressure stored reaches the cut-out threshold. On the next and subsequent control cycles, a test is made to see if the pump is running (4). If this is positive, then the accumulator pressure is compared with the braking demand pressure (13). If the demand is lower than the accumulator pressure then the next comparison is whether the accumulator pressure has yet reached the cut-out threshold (14). If this is true and there is still a braking demand (15), the pump is switched off (16). Should there be at this time no braking demand (15) then the accumulator is isolated (17) so as to prevent any leak down of the accumulator pressure.

If the cut-out pressure had not yet been reached (14) then the pump would be allowed to run for at least a prescribed maximum period (18) designed so as to prevent the motor from overrunning in a fault condition. This period is monitored (19) and should it be exceeded the pump would be switched off (16). This cycle would continue until the cut-out threshold was reached.

3. High braking demand with demand sensed switching of pump.

At various occasions during the braking life of the vehicle, higher than normal braking pressure demands will be requested, for example during a panic or emergency stop. These braking demand pressures will typically be in excess of the pressure stored within the accumulator and appropriate action is required to generate sufficient pressure to satisfy the excess pressure demand. During such a brake application, as the brake pressure rises, the pump would normally not yet have been switched on (4), but soon after the demand pressure will rise above that stored within the accumulator (5), this will immediately cause the pump to be switched on (20). This operation is called 'Demand Sensed Pump Control' and is further described hereinafter with reference to FIGS. 4 and 5. Should the pressure excess be satisfied by this control (21) or the vehicle have come to a standstill (22) then the control cycle will be completed as long as no isolation flag had in the meantime been set (7) and the running of the pump had produced a pressure level within the accumulator that was above the cut-in threshold (8). If the accumulator pressure was less than the cut-in threshold then the pump motor would be run (12) so as to recharge the accumulator accordingly.

4. High braking demand with supercharging of brake system

"Supercharging" by definition is the direct use of the pump to supply the brake control system with sufficient fluid pressure supply having first reduced the level of compliance within the fluid pressure supply system by preferably isolating the fluid pressure accumulator.

This control method is used when the demand pressure level is greater than the stored accumulator pressure (5). The pump is energized (20) and whilst the brake pressure demand is higher than the accumulator pressure (21) and the vehicle is moving (22) the supercharging process starts. There are two modes of supercharging in dependence upon whether the highest pressure balance valves (112, 113) is open or closed (23).

a) balanced braking is when the balance valve (112,113) are open and a mode of operation called 'spill' is selected (24). In this mode of operation, excess loading of the pump and motor and accidental operation of the accumulator blow off valve is prevented by ensuring that the last brake to reach its operating pressure remains in open communication with the working pump. Thereafter, the excess fluid pressure being delivered to that brake can be 'spilled' back to the brake fluid reservoir via the open balance valves (112,113) to the currently closed proportional valve. This will obviously generate a higher than desired pressure within the brake, causing this valve to dump the excess pressure to the fluid reservoir. During this mode of operation, the fluid pressure has to be generated directly by the pump and in order to do this the accumulator isolation valve is operated (25) to close communication between the brake system and the accumulator (26). This continues until the brake pressure demand drops below that of the stored accumulator pressure, whereafter the brake system is supplied conventionally with fluid pressure supply from the accumulator. b) independent control (ABS) creates an additional problem in that during independent control, the balance valves (112, 113) are closed so as to prevent any brake from influencing the control of any other brake. During this mode the balance valves are closed (23) and the pressure control mode is set to "re-charge" mode (27). The accumulator isolation valve is operated (28) to close communication between the accumulator and the brake system. As the balance valves are closed, there is no longer a route by which excess fluid pressure can be relieved. Thus the "re-charge" mode allows intermittent switching of the accumulator isolation valve so as to gradually introduce some compliance into the charging system, thus eliminating the undesirable effects as hereinbefore described. This intermittent communication between the pump and the accumulator also helps to gradually re-charge the accumulator up to the maximum cut-out threshold as desired whilst maintaining a supercharged supply to the brakes.

The above modes of operation are controlled and monitored on each programme cycle until the operating event finishes. At this point the isolation valve can then be re-opened when either the brake pressure drops below the stored accumulator pressure (21) or the vehicle stops moving (22). If the isolation valve is closed, i.e. the accumulator is isolated (7), the pressure control mode is then re-set to normal operation (30) and the isolation valve is then opened (31) to re-connect the accumulator to the brake system (10).

An alternative system is now described based on charging the accumulator 111 to a higher level than the minimum threshold pressure when the demand pressure exceeds the threshold.

Figure 3:
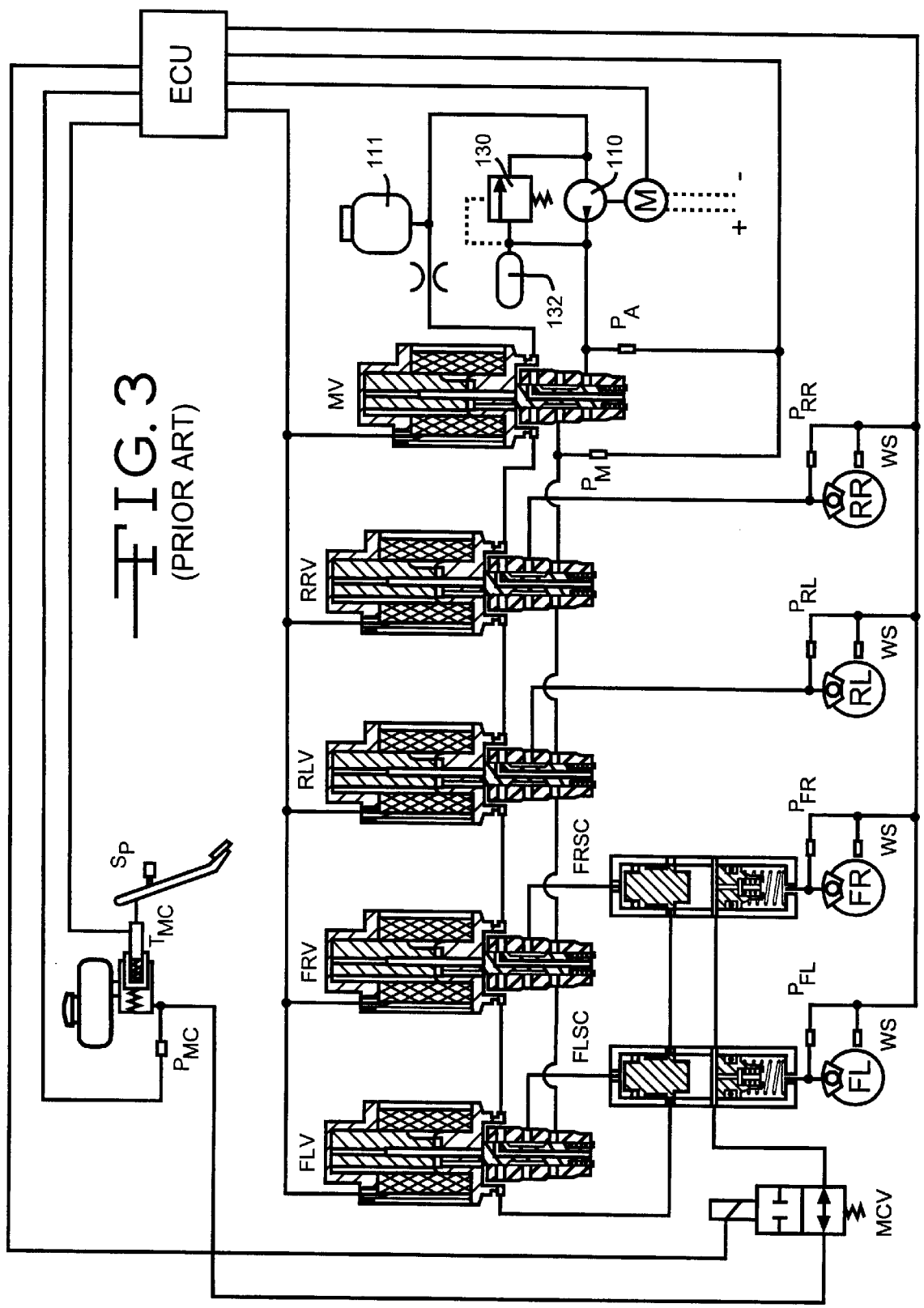
FIG. 3 is a schematic diagram illustrating a conventional braking system.

The same basic system shown in FIG. 1 is used but without the shut-off valve 120 and its associated control logic. A simplified version of the hydraulic circuit of a conventional system is shown in FIG. 3, but giving more details of the control valves. Equivalent parts in FIGS. 1 and 3 are given the same reference numbers.

The system of FIG. 3 includes an accumulator 111 for the storage of hydraulic fluid under pressure. As brake demands are serviced, fluid is drawn from the accumulator, and its pressure falls. The accumulator is provided with a charging system comprising an electrically-driven pump 110. sensing and control means to start and stop the pump motor, a relief valve 130 and a reservoir 132 from which charging fluid is supplied and to which fluid is returned from the braking circuits at the completion of each brake application. This group of components comprise the system's power source. The sensing and control means conventionally include an accumulator-pressure sensor, but the elimination of this would be an attractive cost-reduction measure.

The accumulator 111 provides an instantly-available source of pressurised fluid, enabling rapid application of the vehicle's brakes without the need for a correspondingly large motor and pump. Because motor deterioration is related to the number of times it is started, the fluid volume stored in the accumulator 111 between the cut-out and cut-in pressures is normally arranged to be sufficient for several normal (i.e. low-deceleration) brake applications.

The objective of the charging system in this arrangement is to maintain the accumulator pressure (and therefore available fluid volume) within a given range, by switching the motor M on when the pressure has decayed to the lower limit of the range, and switching it off when the upper range limit has been re-established. For prior-art systems, switching is controlled by pressure-actuated devices, and so the lower range-limit, henceforth called the cut-in pressure, must be set at or above the maximum pressure required by the system's function. It cannot be set any lower because it would then be possible to achieve a stable situation in which the system failed to fulfill the highest demand pressures. For a braking system of this type, 180 bar would be a typical maximum requirement, with normal pressures varying between, say, 10 bar (gentle braking) and 110 bar (laden, high decel.)

The upper range-limit, henceforth called the cut-out pressure, is normally determined by any legal obligations and the economics of component design. One of these factors is the durability of the motor and its switching components. A wide range between cut-in and cut-out pressures minimises the number of times the motor must start from rest; but higher cut-out pressures cause increased size, weight and cost of the pump, accumulator and motor. Energy consumption is also increased by pumping to higher pressures. Prior-art cut-out and cut-in pressures are shown on the attached FIGS. 4 and 5, for which detailed descriptions are given hereinafter.

Thus prior-art arrangements ensure that the power source will always be able to fulfill the system's pressure requirements because the pump will cut-in as soon as the accumulator pressure falls below the highest legitimate demand level. However, they are also relatively expensive and wasteful of energy because maximum system pressures are needed only rarely, e.g. arduous fade conditions, but the accumulator is repeatedly charged to a level in excess of this extreme value. It is also known that high operating pressures reduce the life of gas-charged accumulators.

To meet these problems, the alternative system proposed in accordance with the present invention is adapted to start the pump 110 if it is detected that the braking demand cannot be fulfilled. This enables cost and energy savings by reducing cut-in pressure to a level less than the maximum required brake pressure whilst still ensuring that the specified pressure levels can be met.

Figure 4:
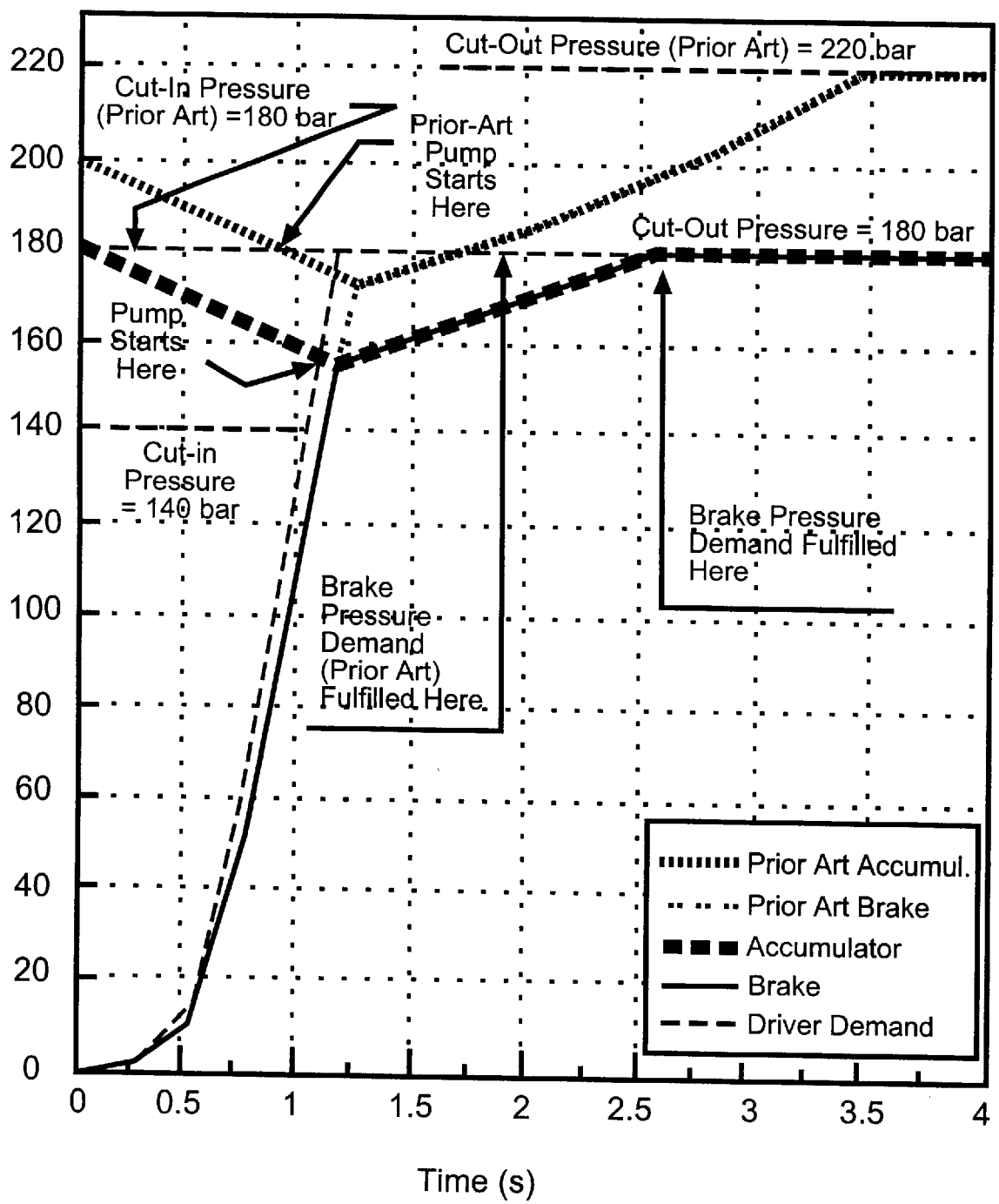
FIG. 4 shows operational curves and FIG. 5 is a flow diagram, both relating to a demand-signal-based version of a demand-switched pump control in accordance with the present invention.
Figure 5:
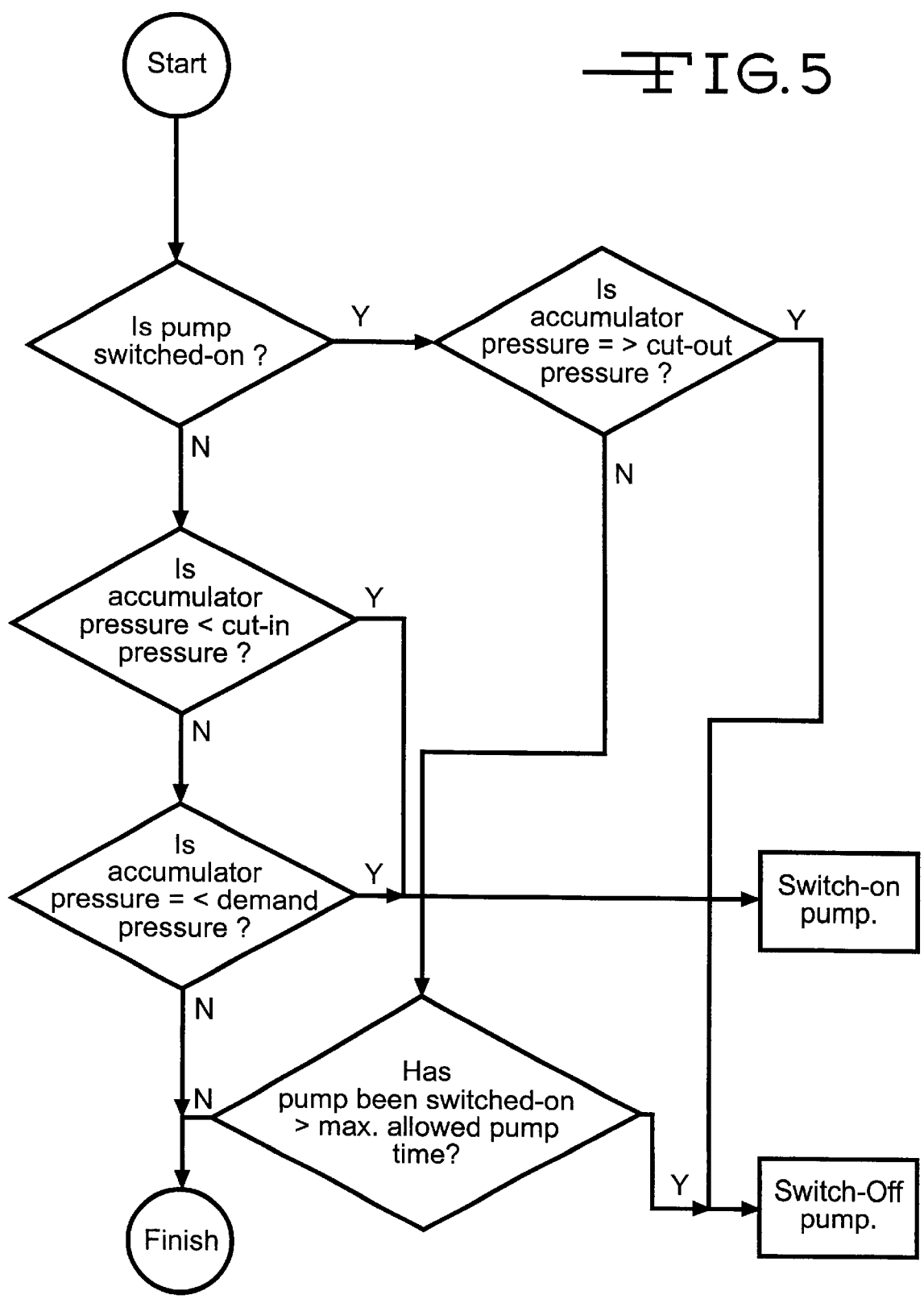

In its most simple form illustrated in FIGS. 4 and 5 (Demand-signal-based version) the pump 110 is started whenever the accumulator pressure is less than either the cut-in pressure or the highest wheel-demand-pressure signal (derived e.g. from the pedal/master cylinder sensors or from an ABS, CDC, TC algorithm).

Figure 6:
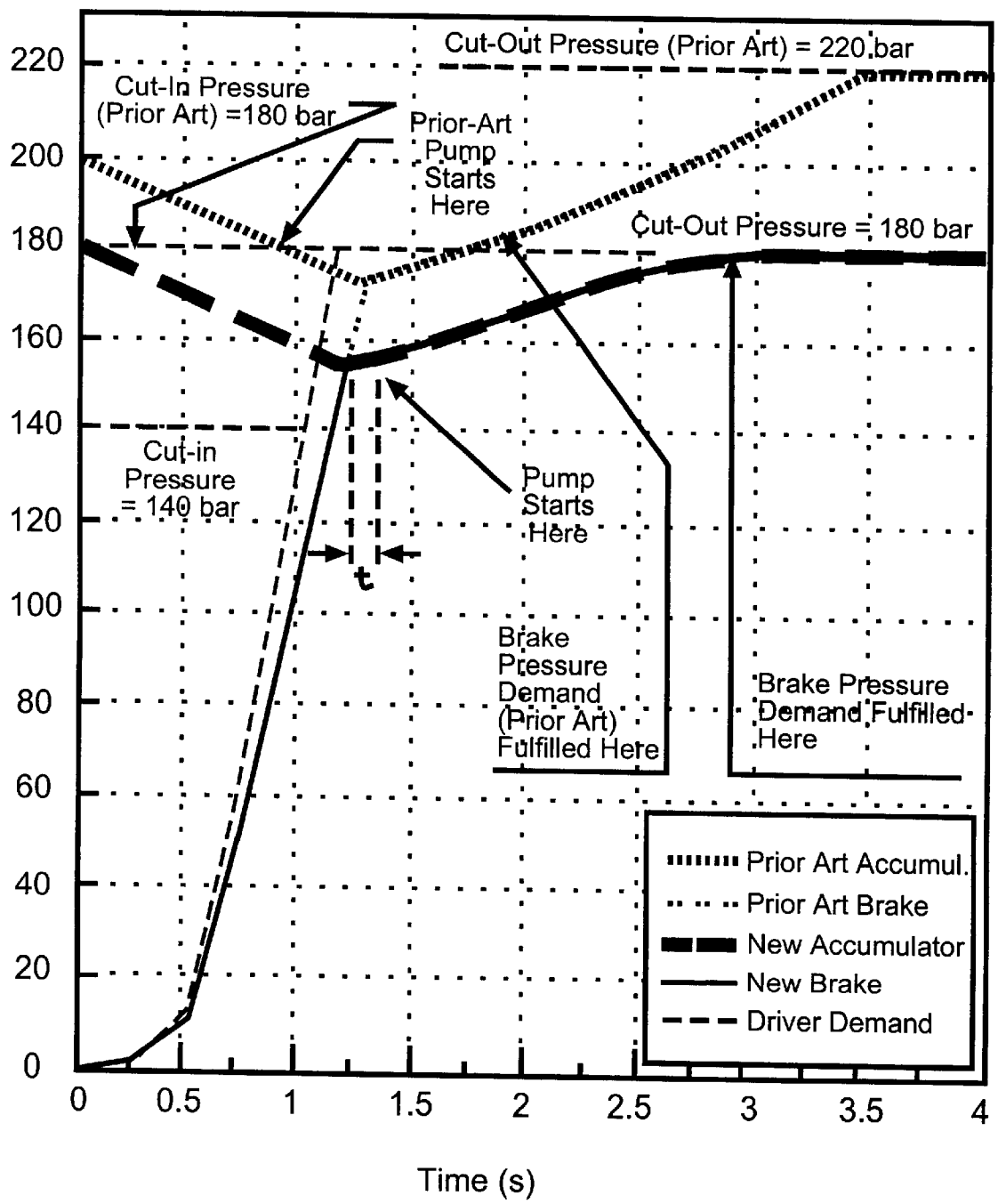
FIG. 6 shows operational curves and FIG. 7 is a flow diagram, both relating to a response-based version of a demand-switcher pump control in accordance with the present invention.
Figure 7:
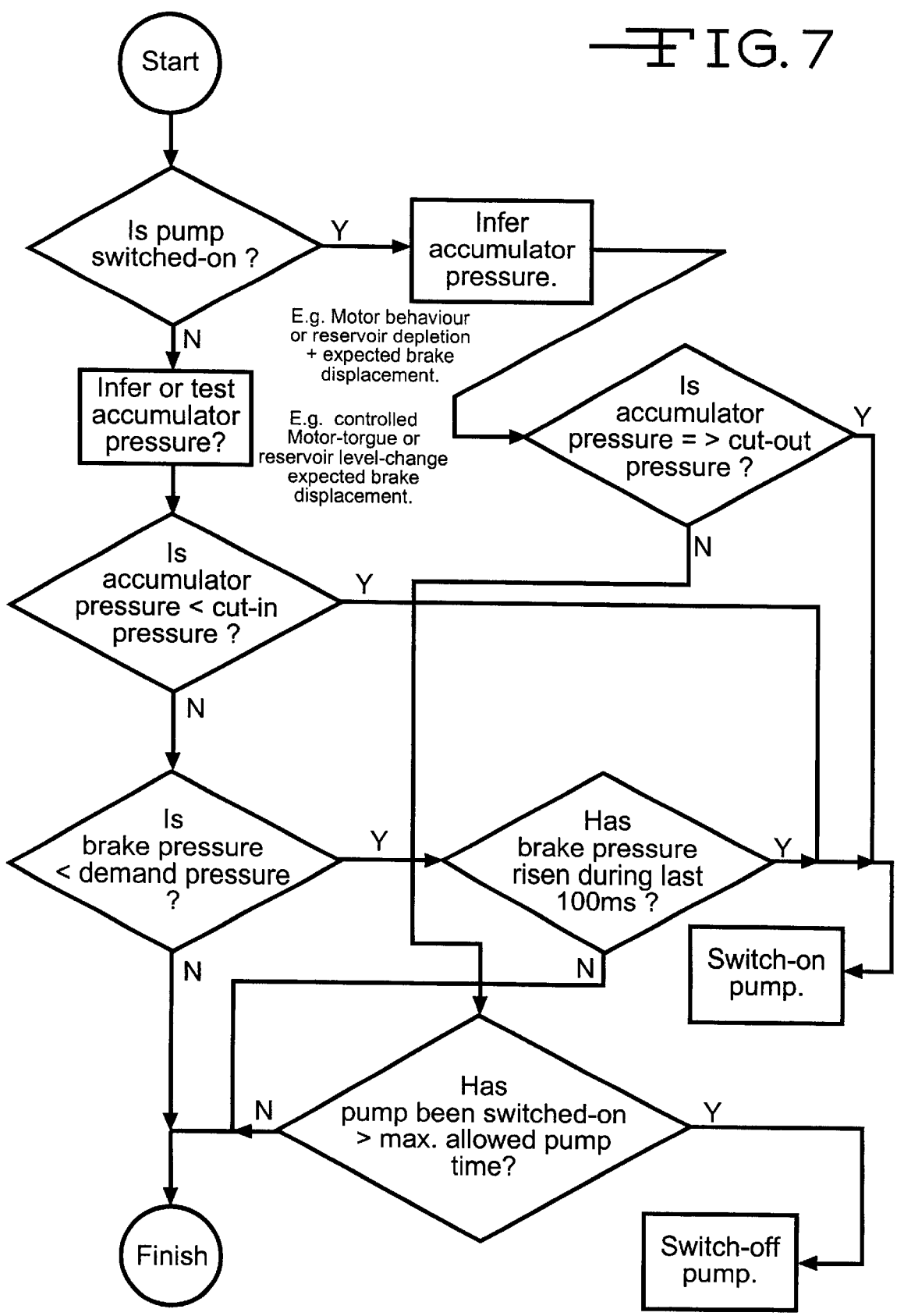

Alternatively, in the arrangement illustrated in FIGS. 6 and 7 (response-based version) the pump 110 is started whenever the accumulator pressure is less than the cut-out pressure, i.e. as above, or whenever brake pressure (derived from the brake pressure sensor(s)) is constant and has remained less than the demand signal for that wheel for more than a predetermined time period. This would be suitable for use in systems without an accumulator-pressure sensor, i.e. systems in which cut-in and cut-out are determined by other techniques.

Once started, the pump 110 will run until the cut-out pressure is reached, or until a predetermined run-time has been exceeded.

The cut-out pressure may also be reduced, but must still be set at or above the maximum required brake pressure.

The advantage of the latter two arrangements is that higher levels of demand will still be fulfilled—despite the savings, although not as quickly as they would otherwise have been. There is a knee-point in the pressure-time characteristic at the settlement pressure. Above this pressure, the pump must raise the pressure in the whole system (charging+braking circuits).

Thus, the present arrangement enables a new and more attractive compromise between cost, bulk, energy-consumption and life on one side versus response-time-under-extreme-conditions on the other. Prior-art systems, being unable to compare demand either with resources or with results, are unable to operate in this optimised fashion.

Referring now in more detail to FIG. 4, there is shown a graph of pressure against time which illustrates the operation of a demand-signal-based version, contrasted with a prior-art system. Prior-art cut-out and cut-in pressures are marked at 220 bar and 180 bar respectively. Typical plots of brake-pressure, accumulator pressure and driver's demand are shown for both the prior-art and the new arrangements. In each case a sustained application to the maximum required brake-pressure of 180 bar is assumed. It will be noted that the brake pressure lags fractionally behind the demand signal, although the extent has been exaggerated for clarity.

The accumulator pressure of the prior-art system is shown having an initial pressure in the middle of its range, with the pump switched off. This is in order to illustrate that the progressive pressurisation of the brakes can cause the accumulator pressure to fall below the cut-in value, and that the pump is too small to prevent the resulting delay in achieving the required pressure of 180 bar. A higher initial pressure may enable settlement to take place above the cut-in pressure, but any initial value between cut-out and cut-in could apply in practice. The pump is switched-off (not marked) when the cut-out pressure of 220 bar is reached in the accumulator. It will be noted that, provided the driver is pressing hard enough, the brakes will be pumped-up to the cut-out pressure together with the accumulator, representing further unnecessary energy consumption. The pump started as soon as the accumulator pressure fell below the cut-in pressure of 180 bar.

The accumulator pressure of the BBW (brake-by-wire) system is shown starting from a fully-charged state, i.e. at a pressure of 180 bar. This is in order to illustrate that the pump can start before the cut-in pressure is reached. The settlement pressure is lower than in the prior-art case because of the lower initial pressure (similar accumulator characteristics assumed) and so it takes longer to reach the 180 bar target (similar pumps assumed). Again, in practice, the initial accumulator pressure could be anywhere between 140 and 180 bar. A low initial value would cause the pump to start on the basis of the accumulator pressure falling below the cut-in value. However, as shown, the pump starts when the demand signal exceeds the accumulator pressure. The demand signal may be a signal representing the driver's effort exerted on the pedal. For example, it could be the result of a direct measurement of effort, or of pressure in a master-cylinder actuated by the pedal, or of the change-in-length of a spring actuated by the pedal (i.e. of pedal travel). Alternatively, the demand signal might be generated in response to automatic braking requirements, such as AICC, CDC, TC etc. The pump is switched-off when the accumulator pressure reaches the cut-out pressure, which in this case is the same as the target pressure. However, had the cut-out value been set above the target pressure, only the accumulator would have been pumped-up to the cut-out level. The brakes would then have been pressure-limited by the BBW control valves at the target level.

FIG. 6 gives more detail of the operation of a response-based version. This embodiment does not rely upon the availability of a signal representing accumulator pressure, provided that accumulator pressure can be controlled by other means. It still assumes a knowledge of driver demand, and also needs brake pressure, preferably in the form of a direct measurement from sensors as in FIG. 3, but possibly inferred from other parameters e.g. wheel slip, solenoid energisation history etc. The prior art curves are the same as those shown in FIG. 4.

The BBW cut-out and cut-in characteristics are also the same as those in FIG. 4, but in this case the pump starts because a time "t" has elapsed during which the brake pressure has not risen any further and is still below the target level. The delay before fulfilling the target pressure is a little longer than for the FIG. 4 version, by an amount corresponding to the demand-signal lead-time plus "t", but the cost advantage is attractive at prevailing pressure-transducer prices.

The aforegoing system therefore provides the advantages of enabling the achievement of the maximum brake pressure specification at reduced cost without restricting the pressure difference between pump cut-out and cut-in.

A further alternative system is now described based on charging the accumulator in accordance with the detected or calculated brake condition, such as brake fade, over several stops or lining mu change during a single stop.

This system therefore monitors brake usage. When, for example, usage has been sufficiently high in a short time it can be inferred that brake temperatures may be so high that future brake applications will be at elevated pressures. The accumulator pressure can then be increased in anticipation of such applications.

As explained hereinbefore, it is desirable to run the power system energy supply at a pressure adequate for most braking demands, e.g. an accumulator pressure of 125 bar. This is quite adequate for braking up to 100 or 105 bar, but not for braking of 160 to 220 bar which can be required under extreme brake fade conditions. High pressures are typically demanded by high deceleration requirements after periods of very high energy braking, or possibly after prolonged periods of moderate energy braking, i.e. after repeated high speed braking, or long downhill descents. In operation (without accumulator isolation as provided by the first aspect of the invention described above) it can take up to 20 seconds to increase system pressure from 130 to 220 bar. However, if monitoring of the braking system could give at least 20 seconds warning of likely high pressure demand, then pre-emptive action could be taken to make those pressures available by the time they were demanded.

Brake-by-wire systems are well equipped with sensing elements, including individual wheel brake pressures and individual wheel speeds. This data allows a good assessment of brake friction to be made from wheel deceleration divided by brake pressure, being proportional to brake torque divided by brake normal force. It has been found that a useful index can be provided in this connection by using the inverse of the latter function, i.e. brake pressure divided by deceleration, with engineering units of "bar per g", and referred to here as the Brake Pressure Index for Fade, or Brake PIF. Typical values might be 100 bar/g for normal braking, going up to 160 or even 220 bar/g for extreme fade. The units can thus be thought of as the brake pressure required to achieve a 1g ($\approx$10 m.s$^2$) deceleration, with high values being "bad" and low values "good".

Advantageously, this index is monitored continuously, its rise over a predetermined threshold is monitored, action then being taken to raise the pressure control window for the accumulator.

Figure 8:
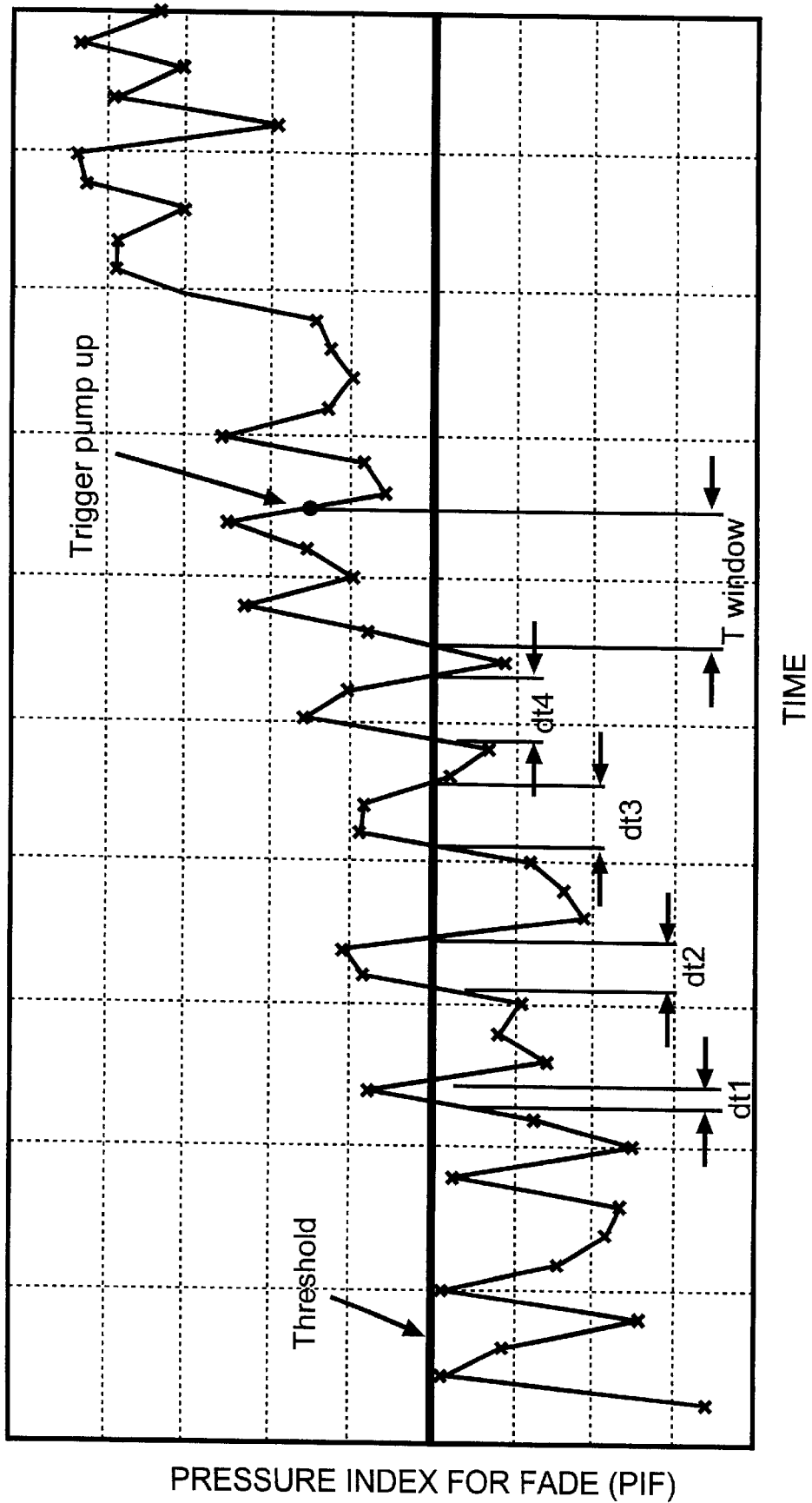
FIG. 8 shows time-based filtering of Pressure Index for Fade in a further system in accordance with the invention.

It is known that brake lining friction is highly variable, being influenced by lining material, temperature, vehicle speed, and past history of use. This, coupled with measurement uncertainty means that considerable variation in the calculated index can be expected over short durations. To avoid spurious triggering of the need to pump up, the calculated index (PIF) should preferably be filtered, for example as shown in FIG. 8.

A time window value is established (Twindow) to ensure that brief excursions over the threshold do not trigger the action. Thus, the first four measurements in FIG. 8 have excursions over the threshold of durations dt1 to dt4 respectively, all less than Twindow. The action is not therefore triggered. The fifth excursion lasts much longer, and the action is therefore triggered at the time Twindow after the last crossing over the threshold.

In addition, braking at very low pressures can sometimes give rise to large values of the PIF, due partly to numerical errors in dividing small numbers, and due to the physical behaviour of the friction materials. It is therefore sometimes necessary to inhibit the triggering action at low pressures, i.e. below some predetermined pressure threshold.

One demanding brake scenario is a long downhill descent, in the extreme case holding a constant speed by braking. The wheel decelerations will therefore be zero, but the vehicle deceleration along its longitudinal (X) axis will have the component of gravity due to the road surface gradient. This latter signal, the true vehicle longitudinal deceleration, is the correct one to use for his application. For many vehicle systems it may also be required for other features such as hill hold, advanced cruise control, and car dynamic control. If the signal is not available, further data processing is needed to infer that braking is taking place without slowing the vehicle down, and to correct for the gradient effect.

Another factor is that of braking distribution between front and rear axles. This varies with many factors—deceleration levels, vehicle loading condition, brake lining condition, and road surface. The brake pressure used in calculating the PIF for the vehicle can be a weighted average from all four wheels. The deceleration used will normally be that from the vehicle accelerometer, or from wheel speeds with the necessary corrections for gradient. It is also possible to calculate a PIF for each wheel, and take a weighted average of all four for the vehicle, or take a weighted average of pressures and calculate the PIF for the vehicle.

During ABS operation, the wheel brake pressures can vary over a wide range whilst vehicle deceleration may not vary so much. In this case, a more consistent measure of the relevant brake pressure is the peak pressures during each ABS cycle. In most cases it will be somewhat higher than the steady brake pressure required to achieve the same deceleration, and will therefore err somewhat on the cautious side for assessing fade.

It is possible to use more than two levels for accumulator pressure, and to use similar techniques to bring the pressures down after a predetermined period of no braking, or of much lighter braking. Of course, if there is no braking, bringing the pressure control windows down will not bring the actual accumulator pressures down until some brake activity is initiated.

Figure 9:
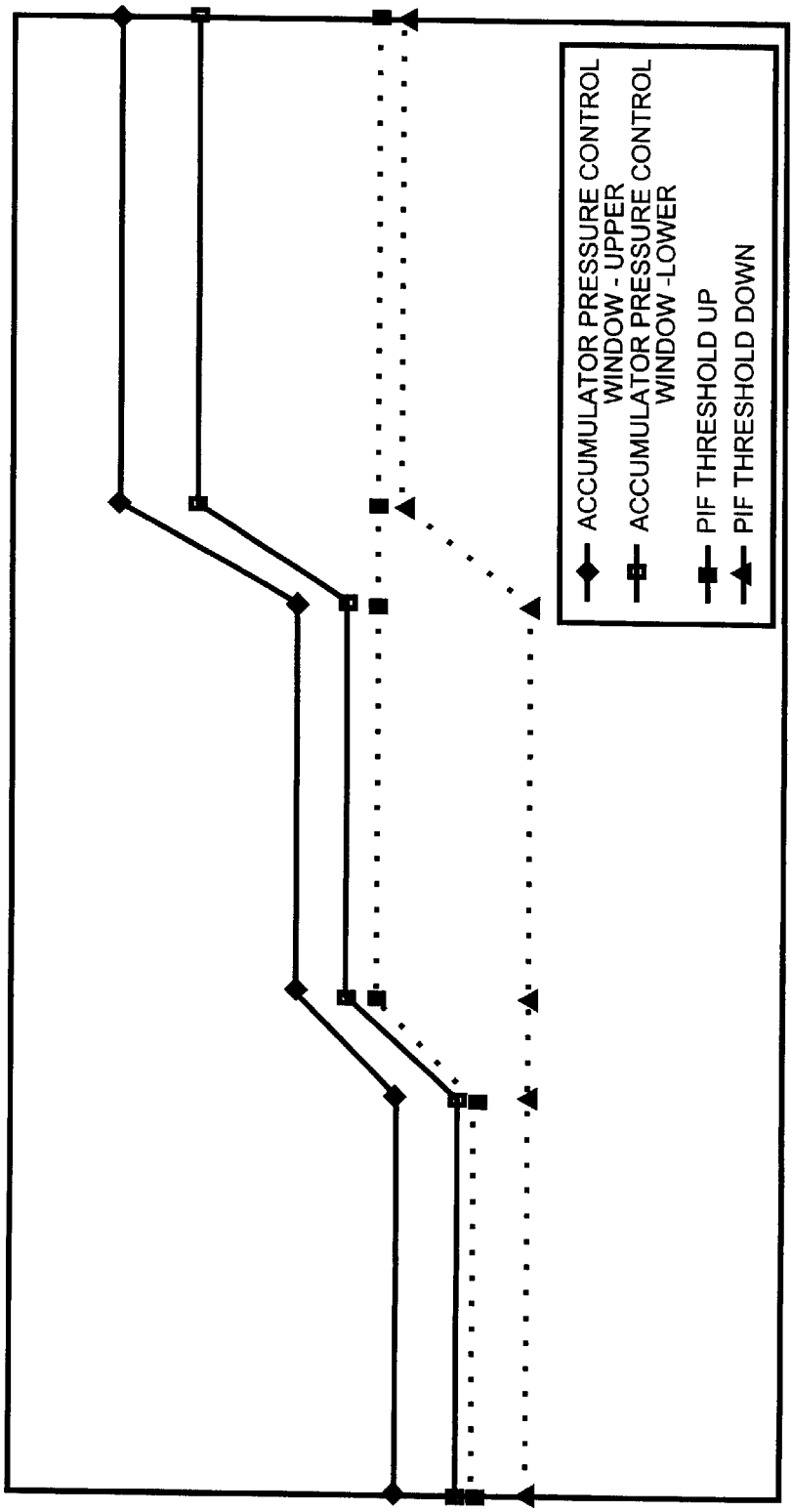
FIG. 9 illustrates possible movement of control windows and thresholds.

A possible set of three accumulator pressure control windows, together with the two PIF thresholds for raising control pressures, and two for reducing pressures is shown in FIG. 9.

Figure 10:
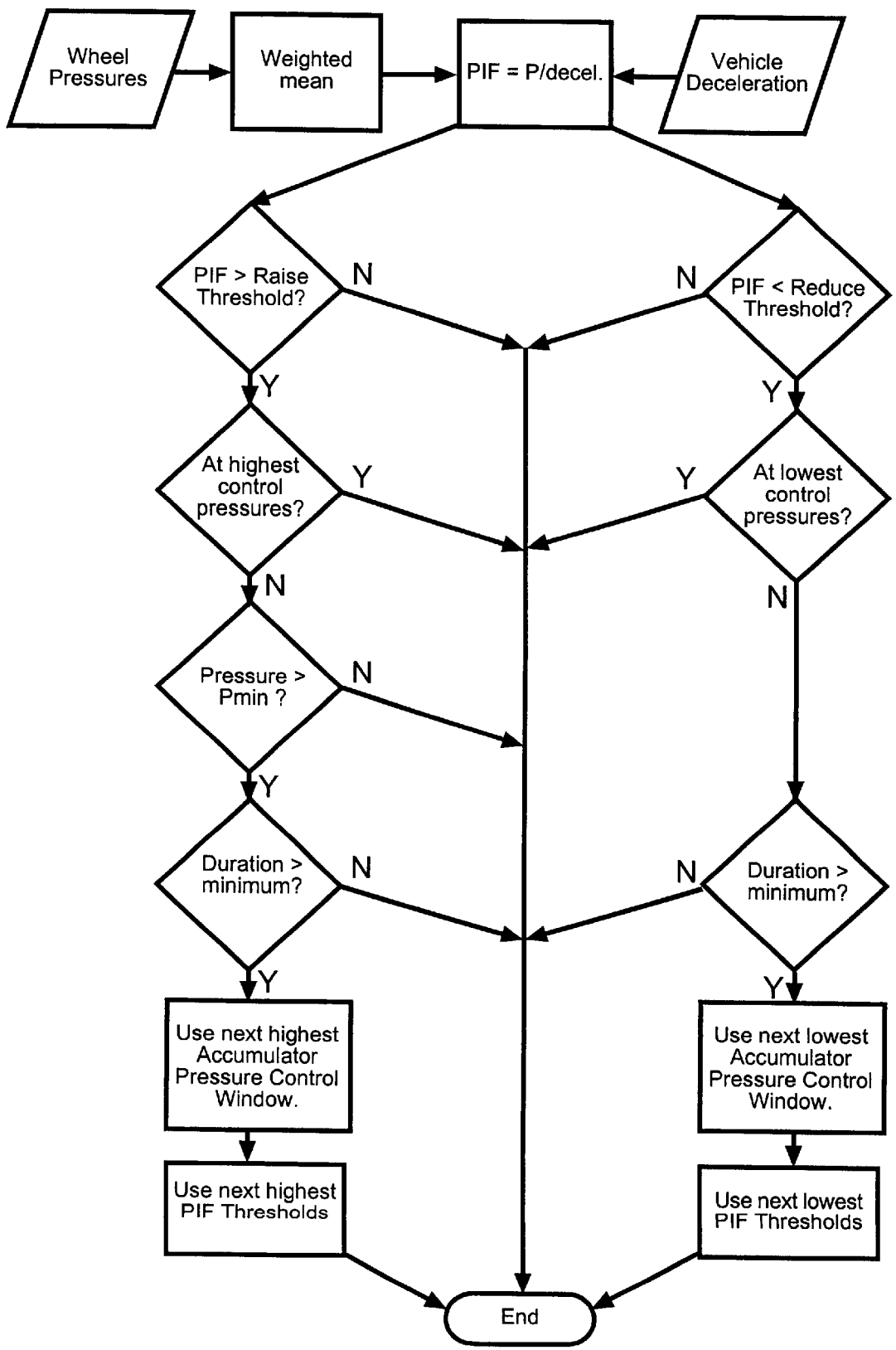
FIG. 10 is a flow chart for one possible decision process in a system in accordance with the invention.

FIG. 10 is a flow diagram illustrating one possible decision process for accomplishing the further aspect of this invention wherein the accumulator is charged in accordance with a detected or calculated brake condition, such as brake fade. The information required to enable this process to be implemented can be summarised as:

Sets of accumulator pressure control windows, or bands, e.g. normal=125/150 bar, first raised pressures=170/190 bar, second raised pressures=230/260 bar.

Pressure Index for Fade (PIF) thresholds for increasing and decreasing pressures, e.g. first raise threshold=120 (bar/g), second raise threshold=160, first reduce threshold=150, second reduce threshold=100.

The weighting for the measured signals from four wheels (pressure wheel deceleration)

Pressure based filtering, i.e. minimum pressure before taking a pressure raise decision, e.g. 10 bar.

Time based filtering, i.e. minimum duration over threshold before taking a pressure raise decision, e.g. 500 milli-seconds.

By use of the aforegoing system, there is provided a means for deciding when the supply pressure for a brake by wire system should be increased above normal operation because of heavy brake usage that may give rise to high pressure demands, whereby sufficient warning is available so that the pressure can be increased before the high pressure demands are made. A similar process can be used to decide when to return to lower or normal pressures. The supply pressures may be increased and decreased in more than one step.

One possible implementation of a system based on monitoring and predicting the vehicle operating conditions such brake fade anticipation, is now described with reference to FIGS. 11, 12 and 13.

The control of the pressure in the accumulator in prior art systems has been maintained at the maximum pressure needed to meet all braking conditions, $P_{max}$. The maximum pressure has been calculated for the maximum hill, the minimum available frictional coefficient for the brake linings, and maximum vehicle loading. Maximum pressure in the accumulator will typically be in the range of 100 bar to 150 bar. Under normal driving conditions, the maximum pressure in the accumulator is in excess of what is needed to safely operate the vehicle. Having the maximum pressure present in the accumulator presents that pressure to the inlet of the proportional control valve(s) 109a, 109b every time the brakes are applied. Such high pressures applied to the inlet of the proportional control valve(s) 54 makes control of the pressure applied to the brakes more difficult than if the pressure were lower. A lower pressure presented to the inlet of the proportional control valve(s) would allow the proportional control valve(s) greater time to position themselves, and would effectively raise the accuracy of the control. Furthermore, charging the accumulator to the maximum pressure and volume at all times puts more strain on the pumping components, and contributes to system noise levels.

According to the present embodiment, the pressure in the accumulator is maintained at the minimum necessary to safely operate the vehicle according to an algorithm computed by the controlling ECU. The ECU receives as inputs to the algorithm, shown schematically in FIG. 13 as f(model), the following parameters:

1. Vehicle Speed;
2. Brake pedal/travel;
3. Pump/discharge pressure;
4. Accumulator/pressure; and
5. Any other desired suitable parameters.

Figure 11:
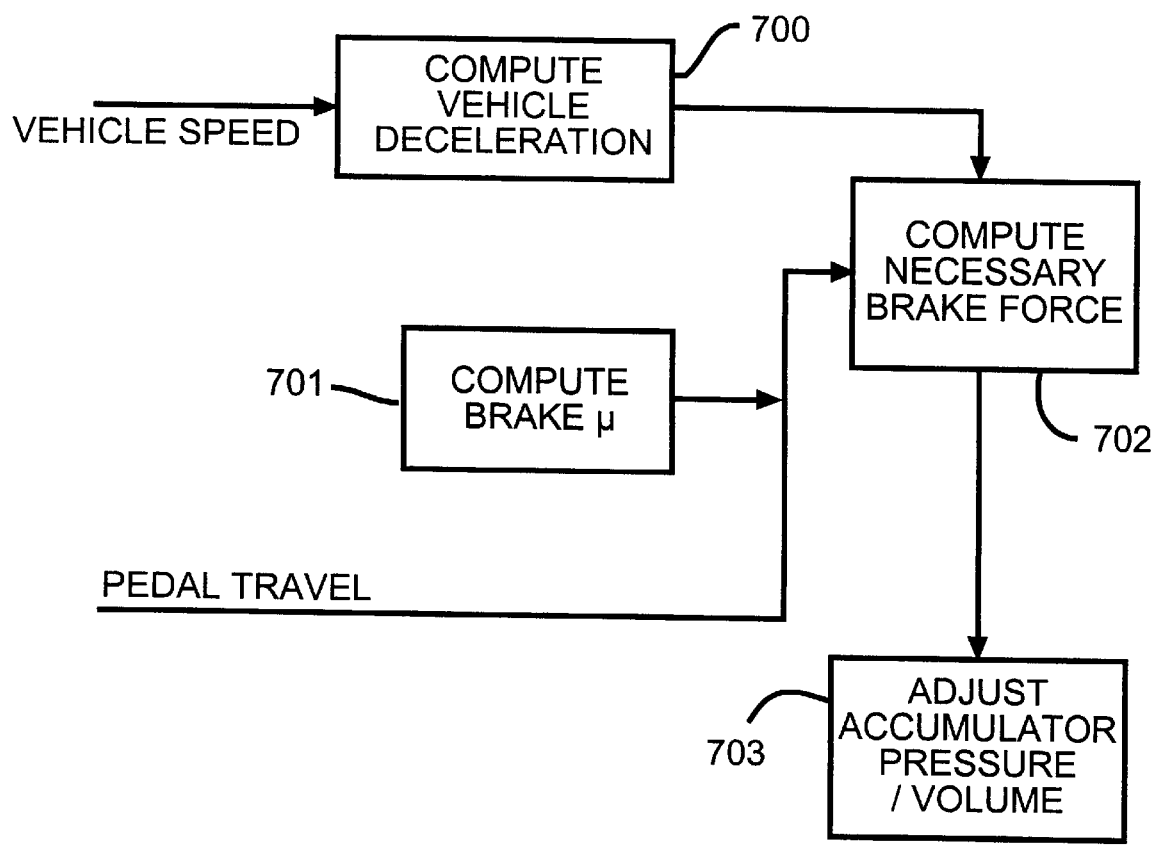
FIGS. 11, 12 and 13 are diagrams illustrating a further embodiment of the invention based on brake fade detection.
Figure 12:
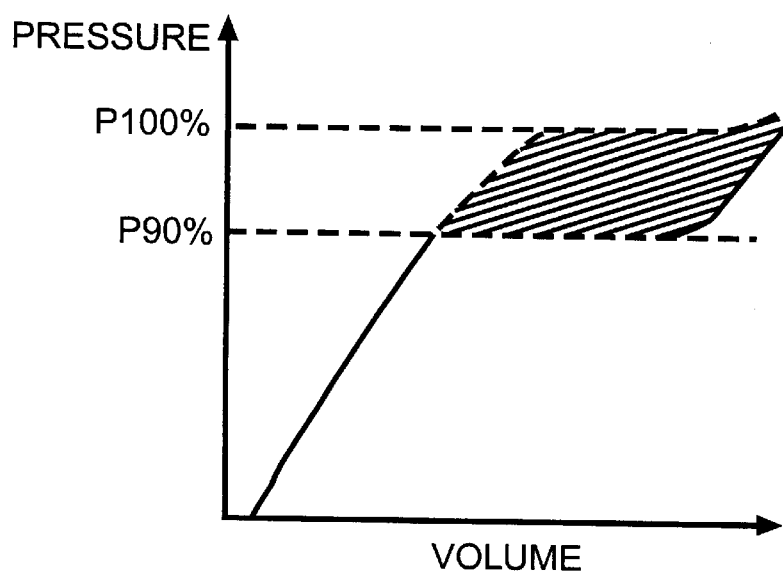

A flow chart of the basic algorithm is shown in FIG. 11.

In step 700, the vehicle deceleration is computed using stored and current values of vehicle speed. In step 701, the coefficient of friction of the brake linings, $\mu$, is computed using a predetermined program or stored parameter matrix, together with information about the last brake operating cycles, including the brake force used and the resultant vehicle deceleration. The computed coefficient of friction $\mu$ and the desired vehicle deceleration are then used, in step 702, to compute the necessary braking force to be applied to the brake calipers of the vehicle brakes. The amount of pressure and volume of brake fluid necessary to have in the accumulator 46 (see FIG. 13) to effect the required braking force under conditions of high road surface friction is computed, and a signal sent to the accumulator valve 48. The accumulator 46 is then pressurized to the required pressure and volume in step 703. The model for computing the required accumulator pressure and volume is a function of several parameters, the relationship of which can be represented as: f(model)=f[deceleration, braked pedal travel, brake lining temperature, brake frictional coefficient, accumulator volume, accumulator pressure deviation, accumulator volume change, and brake operating cycles].

Figure 13:
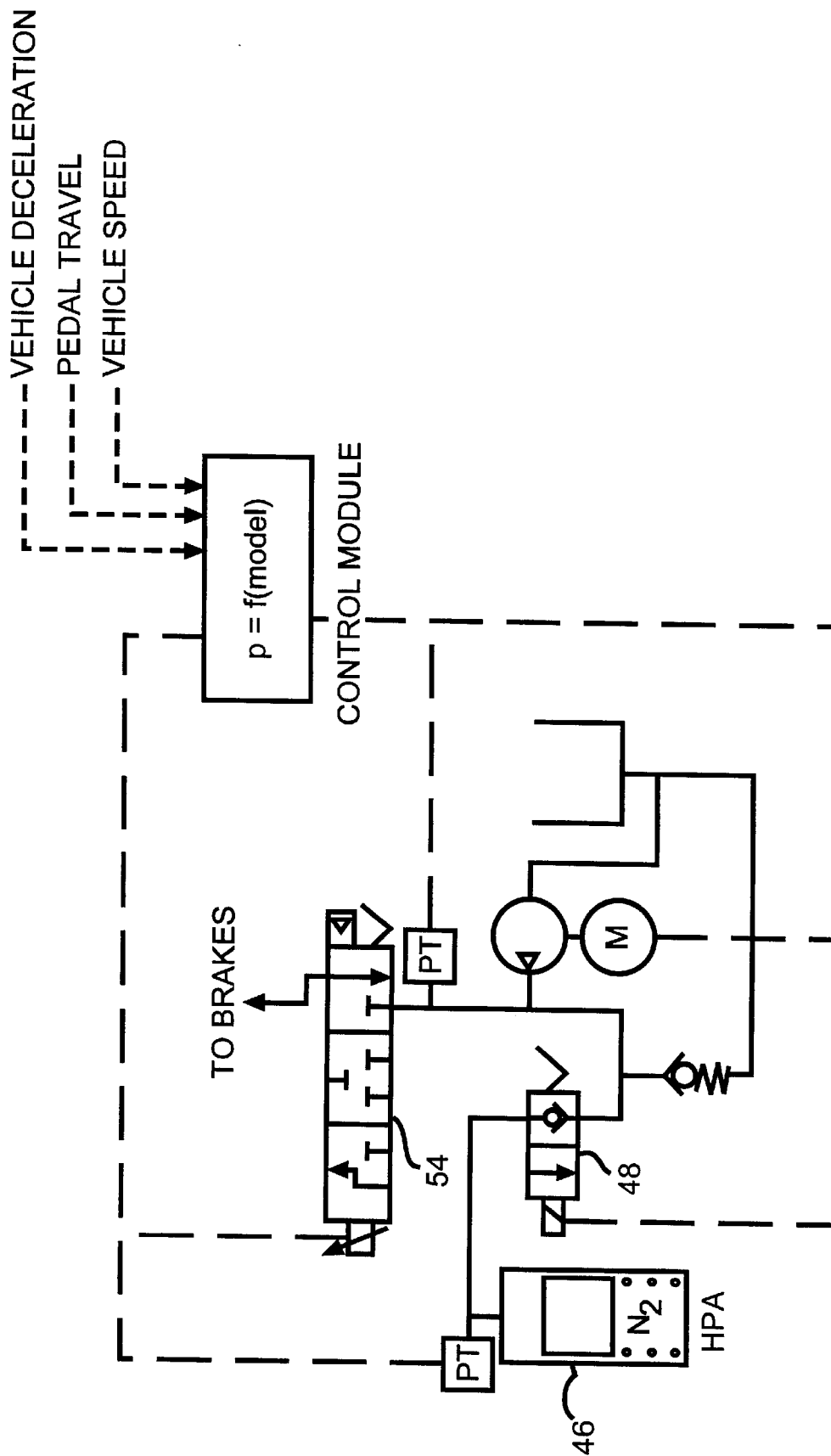

The ECU 34 of FIG. 13 can be programmed to retrieve and store the vehicle operating parameters over a number of brake operating cycles, or over a predetermined period of time, or both. For example, if the vehicle is operated on a road without use of the brake system for an extended period of time, collecting data based on elapsed time might lead to erroneously low pressure in the accumulator 46. It would therefore be more advantageous in this case to store the data from the last braking applications to determine the correct pressure in the accumulator 46. As a further example, if the vehicle were being operated on a steep downhill with continuous application of the brake system, determining the accumulator 46 pressure base upon a predetermined number of past operating cycles may also lead to an erroneously low pressure in the accumulator 46. In this case, it would be better to base the necessary pressure in the accumulator 46 upon current vehicle operating parameters. Preferably, the controlling ECU 34 is suitably programmed to recognize and adapt the program to the current road and vehicle conditions.

In the known system described hereinabove, the accumulator 46 has been kept charged to the maximum pressure $P_{max}$ and volume. Under the present embodiment, accumulator 46 pressure will be normally kept at a pressure $P_{90\%}$ that will achieve 90% of the design maximum braking effort. The f(model) algorithm will be used to determine if the pressure in the accumulator 46 will need to be increased. Only in situations where the extra braking effort is needed such as in the above example, will the accumulator 46 be charged to its maximum pressure. FIG. 12 is a graph representative of the pressure and volume curves for accumulator 46, for $P_{max}$ and $P_{90\%}$. The shaded area between the curves is proportional to the work effort saved by using the reduced pressure and volume in situations where full braking force is unlikely to be needed.

The advantages of using the reduced pressure in the accumulator 46 are: reduction of noise increased component life cycle; increased control of the proportional control valves and improved control pressure profile characteristics. In a braking situation where the road surface does not have a maximum potential frictional coefficient, such as during ice or snow or wet road surface conditions, the accumulator 46 will be pressurized to a low pressure or range of pressures. The frictional coefficient of the road surface can be estimated by an onboard ECU monitoring vehicle operating parameter based on recent braking cycles. Using a low pressure in the accumulator 46 during times of low friction between the road and the tires allows the brake system to more finely control the amount of pressure applied to the vehicle brakes and better avoid lockup conditions.

In summary, the accumulator 46 should normally be charged to the pressure required to ensure wheel lock on a high friction surface. This pressure can be calculated based on brake layout data, an estimate of the brake pad frictional value (calculated from comparisons of brake pressure and resultant vehicle deceleration during driving) and a temperature model of the brakes to allow for fading problems, etc. However, to ensure a minimum level of braking, a predetermined minimum pressure should be kept in the accumulator 46. The charge pressure in the accumulator 46 can be continuously adapted to fit the changing drive and vehicle conditions, and can be measured using either a pressure sensor or digital switches. The accumulator 46 can be constructed and operated to have a pressure-volume curve such that most volume of fluid in the accumulator will be stored around the normal maximum brake operating pressure for wheel lock up, not the maximum pressure for wheel lock up under worst case conditions. If $P_{max}$ were required, based on an estimation that the worst case conditions exists, a small additional amount of pressurized fluid would be pumped into the accumulator 46, raising the pressure to $P_{max}$.

Figure 14:
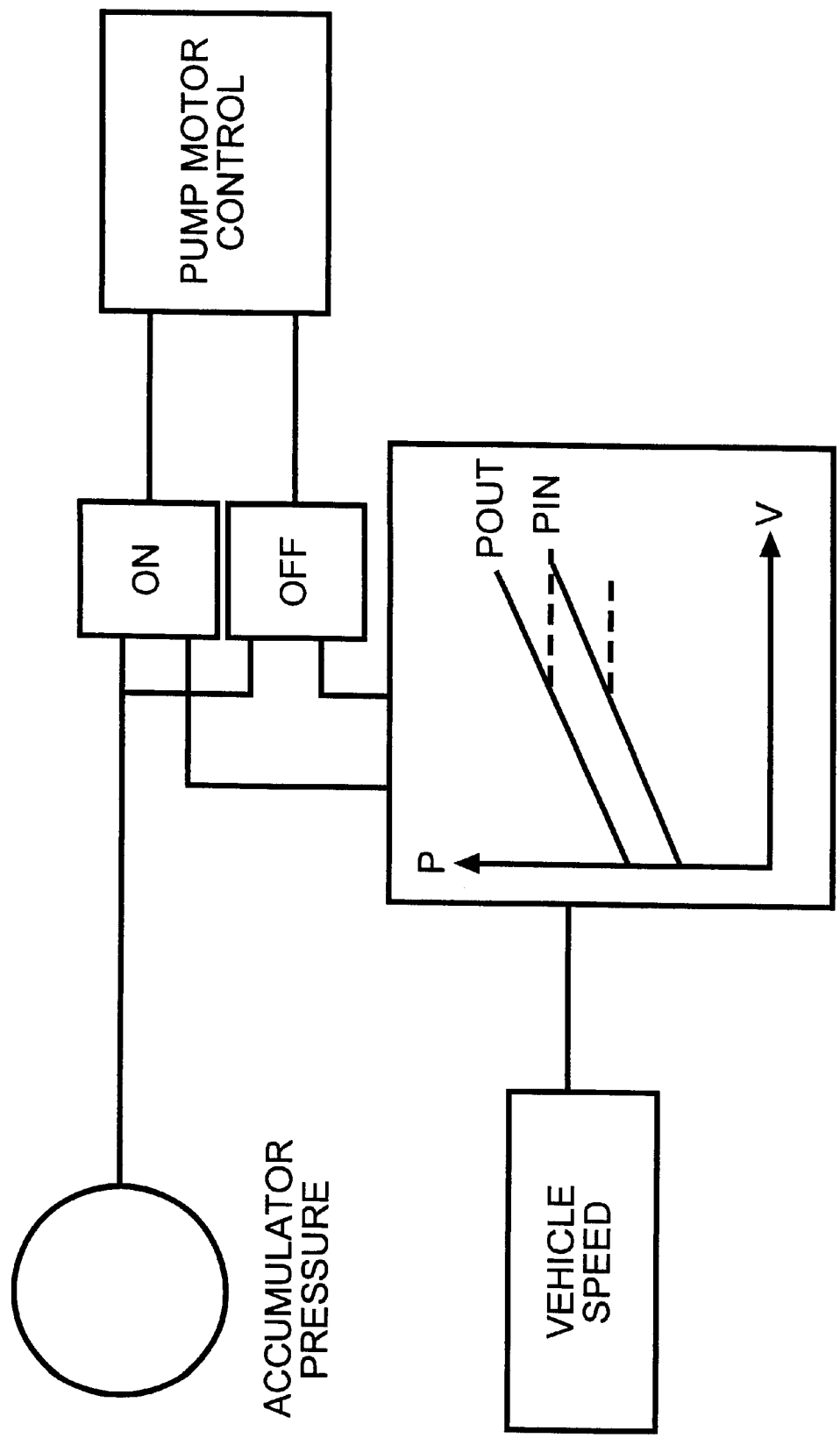
FIG. 14 is a diagrammatic illustration of a still further embodiment based on vehicle speed detection.

In a still further embodiment, the accumulator 111 can be arranged to be charged in dependence upon the vehicle speed so that as the vehicle goes faster, the level of stored pressure in the accumulator 111 is also increased, between appropriate cut-in and cut-out limits. The philosophy behind this embodiment is that as the driver increases the vehicle speed, from say 30mph to 70mph or motorway cruising speed, the more likely he is to demand a high deceleration braking response, and therefore the pressure stored within the accumulator should be appropriately raised in proportion to the vehicle speed as sensed by the vehicle's wheel speed sensors. A simple illustration of this is shown in the attached FIG. 14. The system according to this embodiment can measure the vehicle speed through use of the vehicle wheel speed sensor. This information is used by a system map or look-up table which determines the appropriate cut-in and cut-out pressures for a given vehicle speed. This map starts with a substantially low initial threshold setting for a zero speed or vehicle at standstill up to a maximum, relatively high level as the vehicle speed reaches a maximum. In one alternative, the pressure level can be limited at a given pressure or speed should that pressure be sufficient to cope with the predicted maximum braking demand. Once the cut-in and cut-out thresholds have been selected, they are compared with the actual pressure stored within the accumulator and the pump motor is driven accordingly to charge the accumulator should it be deficient in pressure. As the vehicle speed decreases, the excess pressure can be released via the conventional brake system to the system reservoir.

What is claimed is:

1. An electro-hydraulic braking system for motor vehicles which comprises a brake pedal a braking device which is associated with at least one vehicle wheel and is capable of being brought into communication with an electronically controlled valve arrangement in order to apply hydraulic fluid under pressure to the braking device, a hydraulic pump, and a fluid pressure accumulator fed by the pump, for the provision of pressurised hydraulic fluid which can be passed to the braking device via the electronically controlled valve arrangement, in order to apply hydraulic fluid under pressure, in proportion to the driver's braking demand as sensed at the brake pedal, to the braking device in a 'brake by wire' mode, a first means which provides a level of fluid pressure supply within the electro-hydraulic system whose highest value is less than that sufficient for the maximum possible braking demand level which may be required to be met in use of the vehicle, and a second means which, upon recognition of a braking demand level or of a potential braking demand level which exceeds or will exceed that which can be achieved by said highest value of fluid pressure supply available via said first means, establishes a higher level of fluid pressure supply within the system for controlling the brakes in accordance with the driver's demanded braking level, characterised in that the second means comprises a control arrangement which causes the system stiffness to be increased upon recognition of the higher braking demand or potential, higher demand, which exceeds or will exceed that which can be achieved by said highest value of the fluid pressure supply available via said first means, by isolating the fluid accumulator from the braking system, whereby the braking system is then effectively charged directly from a motor-driven pump to a higher fluid pressure supply level that corresponds to at least the driver's demanded pressure.

2. A system according to claim 1, wherein said control arrangement comprises a valve device disposed between the pump and the fluid accumulator.

3. A system according to claim 1, wherein the pressure in the fluid accumulator is monitored by a pressure sensor.

4. A system according to claim 1, wherein the pressure in the fluid accumulator is monitored by a pressure sensor.

5. An electro-hydraulic braking system for motor vehicles which comprises a brake pedal, a braking device which is associated with at least one vehicle wheel and is capable of being brought into communication with an electronically controlled valve arrangement in order to apply hydraulic fluid under pressure to the braking device, a hydraulic pump, and a fluid pressure accumulator fed by the pump, for the provision of pressurized hydraulic fluid which can be passed to the braking device via the electronically controlled valve arrangement, in order to apply hydraulic fluid under pressure, in proportion to the driver's braking demand as sensed at the brake pedal, to the braking device in a 'brake by wire' mode, a first means which provides a level of fluid pressure supply within the electro-hydraulic system whose highest value is less than that sufficient for the maximum possible braking demand level which may be required to be met in use of the vehicle, and a second means which, upon recognition of a braking demand level or of a potential braking demand level which exceeds or will exceed that which can be achieved by said highest value of fluid pressure supply available via said first means, establishes a higher level of fluid pressure supply within the system for controlling the brakes in accordance with the driver's demanded braking level, characterized in that said second means is adapted to start the pump to charge the accumulator to a higher level, either when the demanded pressure level rises to a level which is higher than that which is currently available from the accumulator, or in advance of a high demand condition, in accordance with a detected or predicted level of brake fade, or lining fade change.

6. A system according to claim 5 wherein said detected or predicted brake fade is measured over several vehicle stops and said detected level of lining fade is measured over a single vehicle stop.

7. A system in accordance with claim 5 wherein said second means is adapted to charge the accumulator to a higher pressure level, in advance of a high demand condition, in dependence upon the detected vehicle speed.

8. A system in accordance with claim 7 wherein as the vehicle goes faster, the level of stored fluid pressure in the accumulator is increased by said second means, between appropriate cut-in and cut-out limits.

9. A system in accordance with claim 8 wherein the vehicle speed is measured using vehicle wheel speed sensors, this information being used by a system map or look-up table to determine the appropriate cut-in and cut-out pressures for a given vehicle speed.

10. An electro-hydraulic braking system for motor vehicles, comprising:
    a brake pedal;
    a braking device which is associated with at least one vehicle wheel and is capable of being brought into communication with an electronically controlled valve arrangement in order to apply hydraulic fluid under pressure to the braking device;
    a hydraulic pump;
    a hydraulic pressure reservoir fed by the hydraulic pump for providing pressurized hydraulic fluid to the braking device via the electronically controlled valve arrangement in proportion to the driver's braking demand sensed at the brake pedal and at a fluid pressure supply level less than a maximum possible braking demand level which may be required to be met in use of the vehicle;
    a shut-off valve positioned between the hydraulic pump and the hydraulic-pressure reservoir, the shut-off valve being capable of isolating the hydraulic pressure reservoir from the braking device to increase the electro-hydraulic braking system stiffness; and
    an electronic control unit monitoring operation of the brake system and controlling operation of the shut-off valve to close the shut-off valve upon recognition of a higher braking demand or a potential higher braking demand that exceeds or will exceed that which can be achieved by the fluid pressure supply level from the hydraulic pressure reservoir, wherein the braking device is charged directly from the hydraulic pump to a higher fluid pressure supply level that corresponds to at least the driver's braking demand.

11. A system according to claim 10, wherein the shut-off valve comprises an electro-magnetically actuatable ball valve.

12. An electro-hydraulic braking system for motor vehicles, comprising:
    a brake associated with at least one vehicle wheel;
    an electronically controlled valve arrangement in fluid communication with the brake for applying hydraulic fluid under pressure to the brake;
    a hydraulic pump;
    a pressure reservoir in fluid communication with the hydraulic pump for providing pressurized hydraulic fluid to the brake through the electronically controlled valve arrangement in proportion to a driver's braking demand level; and
    an electronic control unit adapted to start the hydraulic pump to charge the pressure reservoir to a higher level in advance of a high demand condition in accordance with a detected or predicted level of brake fade or lining fade change.

13. A system according to claim 12, further including a shut-off valve capable of isolating the pressure reservoir from the remainder of the braking system to directly supply hydraulic fluid from the hydraulic pump to the brake when the driver's braking demand pressure level is higher or potentially higher than the fluid pressure level from the pressure reservoir.

14. A system according to claim 12, wherein the detected or predicted brake fade is measured over several vehicle stops and the detected level of lining fade is measured over a single vehicle stop.

15. A system according to claim 12, wherein the shut-off valve comprises an electro-magnetically actuatable ball valve.

* * * * *

UNITED STATES PATENT AND TRADEMARK OFFICE
CERTIFICATE OF CORRECTION

PATENT NO. : 6,318,817 B1  
DATED : November 20, 2001  
INVENTOR(S) : Peter Martin et al.

Page 1 of 1

It is certified that error appears in the above-identified patent and that said Letters Patent is hereby corrected as shown below:

<u>Column 18, claim 1,</u>  
Line 2, after "pedal" insert a -- , --.

Signed and Sealed this

Sixteenth Day of April, 2002

*Attest:*

JAMES E. ROGAN  
*Attesting Officer*     *Director of the United States Patent and Trademark Office*